US012706064B2

(12) United States Patent
Lee et al.

(10) Patent No.: US 12,706,064 B2
(45) Date of Patent: Aug. 11, 2026

(54) DISPLAY DEVICE

(71) Applicant: LG Display Co., Ltd., Seoul (KR)

(72) Inventors: Chan Ho Lee, Paju-si (KR); Dae-Hyun Nam, Paju-si (KR); Hyung-Beom Shin, Paju-si (KR); Se-Eung Lee, Paju-si (KR); Chan Soo Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/252,769

(22) Filed: Jun. 27, 2025

(65) Prior Publication Data

US 2026/0188273 A1 Jul. 2, 2026

(30) Foreign Application Priority Data

Dec. 27, 2024 (KR) ........................ 10-2024-0198871

(51) Int. Cl.
*G09G 3/3266* (2016.01)
*G09G 3/36* (2006.01)

(52) U.S. Cl.
CPC ... *G09G 3/3677* (2013.01); *G09G 2310/0286* (2013.01); *G09G 2310/04* (2013.01); *G09G 2320/10* (2013.01); *G09G 2330/021* (2013.01); *G09G 2330/04* (2013.01); *G09G 2340/0435* (2013.01)

(58) Field of Classification Search
CPC ......... G09G 3/3677; G09G 2310/0286; G09G 2310/04; G09G 2320/10; G09G 2330/021; G09G 2330/04; G09G 2340/0435; G09G 3/3266
See application file for complete search history.

(56) References Cited

U.S. PATENT DOCUMENTS

| | | | | |
|---|---|---|---|---|
| 2022/0375412 A1* | 11/2022 | Kim | ..................... | G09G 3/3225 |
| 2025/0046255 A1* | 2/2025 | Kwon | .................. | G09G 3/3266 |
| 2025/0232733 A1* | 7/2025 | Kim | ..................... | G09G 3/3275 |

FOREIGN PATENT DOCUMENTS

| | | | |
|---|---|---|---|
| KR | 20190041347 | A | 4/2019 |
| KR | 20190129151 | A | 11/2019 |
| KR | 20220001037 | A | 1/2022 |
| KR | 20220161602 | A | 12/2022 |

* cited by examiner

*Primary Examiner* — Lixi C Simpson
(74) *Attorney, Agent, or Firm* — Fish & Richardson P.C.

(57) ABSTRACT

A display device includes a display panel and a gate driver, wherein the gate driver includes a plurality of stages each having a node Q electrically connected to a scan output terminal outputting a scan signal, a node Q' electrically connected to a carry output terminal outputting a carry signal, and a protection transistor having a first electrode connected to the node Q and a second electrode connected to the node Q', an active area includes a dynamic image area in which a dynamic image is displayed during a first frame period and a still image area in which a still image is displayed during the first frame period, a protection transistor provided in a first stage corresponded to the dynamic image area is turned on and a protection transistor provided in a second stage corresponded to the still image area is turned off during the first frame period.

12 Claims, 16 Drawing Sheets

P3 at still Image Area

DISPLAY DEVICE

CROSS REFERENCE TO RELATED APPLICATIONS

Pursuant to 35 U.S.C. § 119(a), this application claims the benefit of an earlier filing date and right of priority to Korean Patent Application No. 10-2025-0198871, filed on Dec. 27, 2024, the contents of which are hereby incorporated by reference in their entirety.

TECHNICAL FIELD

The present disclosure relates to a display device.

BACKGROUND

With the development of information technology, the market for display devices serving as connecting media between users and information is growing. Accordingly, the use of display devices such as light emitting display (LED) devices, quantum dot display (QDD) devices, and liquid crystal display (LCD) devices, is increasing.

SUMMARY OF THE DISCLOSURE

In one aspect, a display device includes a display panel having an active area and a non-active area, and a gate driver configured to sequentially supply a scan signal to a plurality of gate lines connected to subpixels of the display panel, wherein the gate driver includes a plurality of stages each having a node Q electrically connected to a scan output terminal outputting the scan signal, a node Q' electrically connected to a carry output terminal outputting a carry signal, and a protection transistor having a first electrode connected to the node Q and a second electrode connected to the node Q', the active area includes a dynamic image area in which a dynamic image is displayed during a first frame period and a still image area in which a still image is displayed during the first frame period, a protection transistor provided in a first stage related to the dynamic image area among the plurality of stages is turned on during the first frame period, and a protection transistor provided in a second stage corresponded to the still image area among the plurality of stages is turned off during the first frame period.

The protection transistor of the second stage may be turned off while the node Q' is bootstrapped in response to input of a carry clock signal during the first frame period.

The protection transistor of the first stage may be turned on while the node Q' is bootstrapped in response to input of the carry clock signal during the first frame period.

The protection transistor of the first stage may be turned on and the protection transistor of the second stage is turned off while the node Q' is bootstrapped during the first frame period.

A voltage of the node Q' may be higher than a voltage of the node Q in the second stage while the node Q' is bootstrapped during the first frame period.

The first stage may output a scan signal having a turn-on voltage and a carry signal having a turn-on voltage to the dynamic image area, and the second stage may output the scan signal having a turn-off voltage and the carry signal having the turn-on voltage to the still image area during the first frame period.

The first stage may receive a carry clock signal having a turn-on voltage and a scan clock signal having a turn-on voltage, and the second stage may receive a carry clock signal having a turn-on voltage and a scan clock signal having a turn-off voltage during the first frame period.

The plurality of stages may include a charging part configured to control supply of a turn-on voltage to the node Q, the node Q', and a node QB, a discharging part configured to control supply of a turn-off voltage to the node Q, the node Q', and the node QB, and an output part configured to control output of a scan signal according to voltages of the node Q and the node QB, and control output of a carry signal according to voltages of the node Q' and the node QB.

The output part may include a carry output part configured to control output of the carry signal in response to input of a carry clock signal, and a scan output part configured to control output of the scan signal in response to input of a scan clock signal.

Each of the plurality of stages may further include a stabilizer configured to supply a turn-off voltage to the node Q, the node Q', and the node QB and supply a turn-off voltage to the carry output part and the scan output part in a blank period of the first frame.

The plurality of stages may be located in the non-active area and connected to a plurality of scan clock lines through which a scan clock signal is supplied and a plurality of carry clock lines through which a carry clock signal is supplied, wherein the one line of the scan clock lines and the carry clock lines may be provided on one side of the plurality of stages, and the other one line may be provided on the other side of the plurality of stages.

The One line of the scan clock lines and the carry clock lines may be located between an edge line of the display panel and the plurality of stages, and the other one line may be located between the plurality of stages and subpixels of the active area.

BRIEF DESCRIPTION OF THE DRAWINGS

The accompanying drawings, which are included to provide a further understanding of the present disclosure and are incorporated in and constitute a part of this application, illustrate implementation(s) of the present disclosure and together with the description serve to explain the principle of the present disclosure. In the drawings.

DETAILED DESCRIPTION OF THE DISCLOSURE

Figure 1:
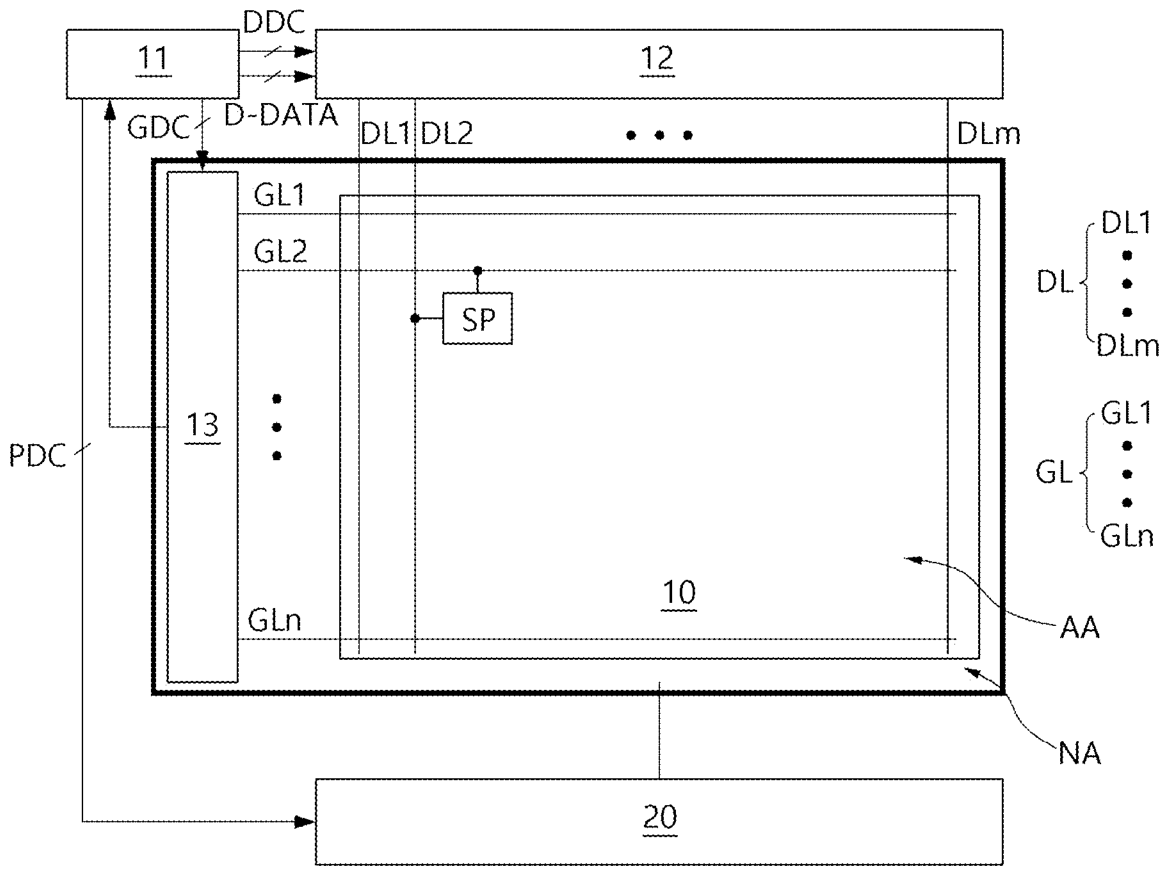
FIG. 1 is a diagram illustrating an example of a display device applicable to the present disclosure.

Display devices can display images by allowing selected subpixels to transmit light or directly emit light when scan signals and data signals are supplied to subpixels formed on a display panel.

A scan signal can be supplied by a gate driver connected to a gate line. The gate driver includes a plurality of stage circuits, and each stage circuit can be connected to each gate line. The stage circuits can sequentially supply scan signals to a plurality of gate lines in a frame period, and images can be displayed according to data signals input in response to the scan signals.

An object of the present disclosure is to provide a display device capable of reducing power consumption.

Another object of implementations of the present disclosure is to provide a structure capable of preventing damage to some transistors provided in a gate driver in a process of selectively supplying a scan signal.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

Hereinafter, implementations will be described in detail with reference to the attached drawings.

Identical drawing numerals refer to identical components. In addition, some of the drawings may be exaggerated for effective description of the thicknesses, ratio, and dimensions of components. The scale of the components illustrated in the drawings is different from the actual scale for the convenience of description and is not limited to the scale illustrated in the drawings.

In the present disclosure, when a component (or region, layer, part, or the like) is referred to as being "on", "connected to", or "coupled to" another component, it means that the component can be directly connected/coupled to the other component, or a third component may be disposed therebetween.

"And/or" encompasses all possible combinations of the constituent components.

Although the terms "first", "second", etc. may be used to describe various components, the components are not limited by the terms. The terms are only used to distinguish one component from another. For example, without departing from the scope of the present implementations, a first component may be referred to as a second component, and similarly, the second component may also be referred to as the first component. The singular expression includes the plural expression unless the context clearly indicates otherwise.

It should be understood that the term "include" or "have" is intended to specify the presence of a feature, a number, a step, an operation, a component, a part, or a combination thereof described in the specification, and does not preclude the possibility of the presence or addition of one or more other features, numbers, steps, operations, components, parts, or combinations thereof.

Features of various implementations of the present disclosure may be partially or wholly combined or joined with each other, and may be technically interconnected and operated in various manners, and the implementations may be implemented independently of each other or may be implemented in an interconnected relationship.

Hereinafter, a display device of the present disclosure will be described through the attached drawings and implementations as follows.

Figure 2:
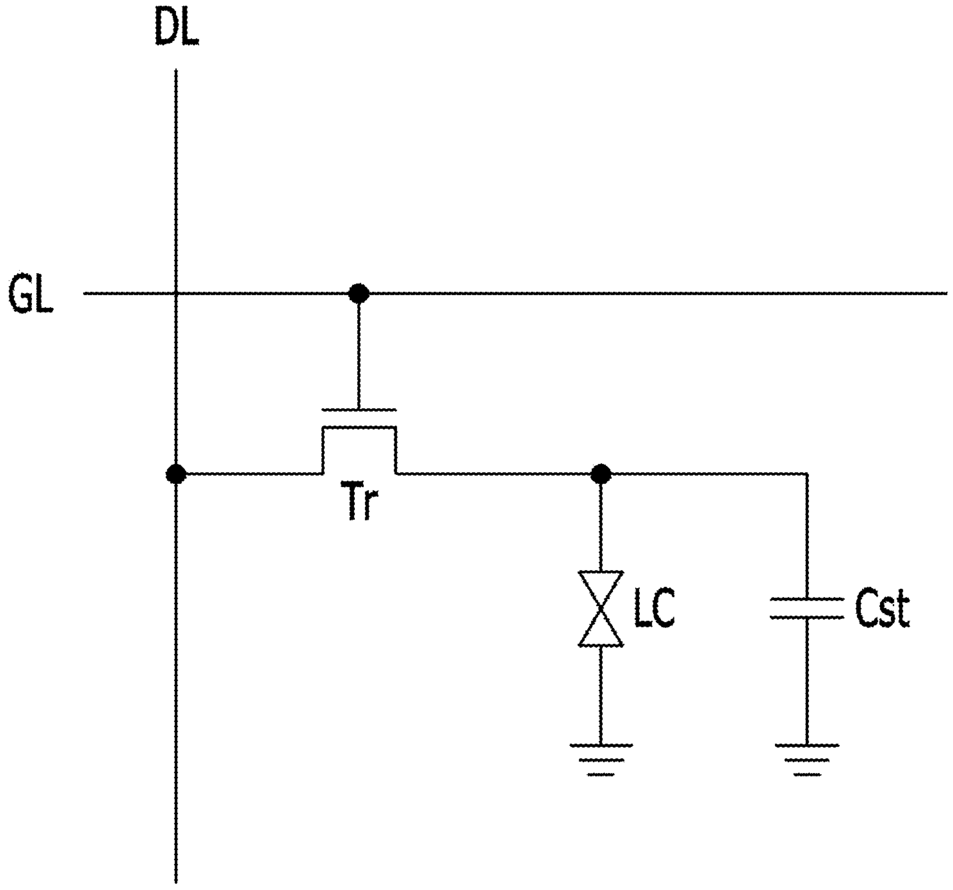
FIG. 2 is a diagram illustrating an example of a pixel equivalent circuit applicable to each subpixel of FIG. 1.

FIG. 1 is a diagram illustrating an example of a display device applicable to the present disclosure, and FIG. 2 is a diagram illustrating an example of a pixel equivalent circuit applicable to each subpixel of FIG. 1.

As illustrated in FIG. 1, a display device according to an implementation of the present disclosure may include a display panel 10, a timing controller 11, a data driver 12, a gate driver 13, and a power supply 20.

Although FIG. 1 illustrates an example of a case in which the timing controller 11, the data driver 12, and the power supply 20 are provided separately, some or all of the timing controller 11, the data driver 12, and the power supply 20 may be integrated into a drive integrated circuit. In FIG. 1, the data driver 12, the gate driver 13, and the power supply 20 may include a panel driving circuit for driving the display panel 10.

The display panel 10 may include an active area AA and a non-active area NA.

Although FIG. 1 illustrates an example of a case in which the gate driver 13 is provided separately from the display panel 10, the present disclosure is not limited thereto, and the gate driver 13 may be provided within the non-active area NA of the display panel 10 and may be formed directly on the substrate of the display panel 10 in a gate-driver-in-panel (GIP) structure.

The active area AA may be an area for displaying an image. A plurality of subpixels SP is disposed in the active area AA, and an image can be displayed using the plurality of subpixels SP. The area where the plurality of subpixels SP is disposed may be the active area AA, and an area other than the active area AA may be the non-active area NA.

The plurality of subpixels SP disposed in the active area AA may display different colors, such as red (R), green (G), and blue (B), for example.

The non-active area NA may be an edge area surrounding the active area AA for displaying an image. At least one panel driving circuit for driving the plurality of subpixels SP may be disposed in the non-active area NA.

The timing controller 11 may supply digital image data D-DATA transmitted from a host system (not shown) to the data driver 12.

The timing controller 11 may receive timing signals such as a vertical synchronization signal, a horizontal synchronization signal, a data enable signal, and a dot clock signal from the host system and generate timing control signals for controlling the operation timing of the panel driving circuit.

The timing control signals may include a gate timing control signal GDC for controlling the operation timing of the gate driver 13, a data timing control signal DDC for controlling the operation timing of the data driver 12, and a power timing control signal PDC for controlling the operation timing of the power supply 20.

The data driver 12 may be connected to the plurality of subpixels SP through data lines DL (DL1 to DLm). The data driver 12 may generate data voltages, which are analog signals required to drive the plurality of subpixels SP, based on digital image data D-DATA input from the timing controller 11, and supply the data voltages to the data lines DL.

The data driver 12 may sample and latch the digital image data D-DATA input from the timing controller 11 on the basis of the data timing control signal DDC to convert the digital image data D-DATA into parallel data, convert the digital image data D-DATA into analog data voltages according to gamma compensation voltages through a digital-to-analog converter (hereinafter, DAC), and supply the analog data voltages to the plurality of subpixels SP through the data lines DL. The analog data voltages may have different analog voltage levels corresponding to image grayscales to be expressed by the plurality of subpixels SP.

The data driver 12 may output data voltages to the plurality of subpixels SP according to the data timing control signal DDC. The data driver 12 may be composed of a plurality of source driver integrated circuits. The source driver integrated circuit may include a shift register, a latch, a level shifter, a DAC, and an output buffer.

The gate driver 13 may generate scan signals SC on the basis of the gate timing control signal GDC and supply the scan signals SC to the plurality of subpixels SP through gate lines GL (GL1 to GLn). In addition, the gate driver 13 may generate a carry signal CRY to be supplied to a plurality of stages provided therein such that the scan signals SC are sequentially supplied.

For example, the gate driver 13 may generate the carry signal CRY based on a carry clock signal supplied as a type of gate timing control signal GDC from the timing controller 11 and generate a scan signal SC based on a scan clock signal supplied as a type of gate timing control signal GDC.

The power supply 20 may process input power according to the power timing control signal PDC and supply power for driving the plurality of subpixels SP. In some cases, the power supply 20 may supply driving power required for the operation of the gate driver 13.

At least one of the plurality of sub-pixels SP may include, for example, a driving transistor Tr, a capacitor Cst, and a liquid crystal layer LC, as illustrated in FIG. 2.

The driving transistor Tr may have a gate electrode connected to a gate line GL, a first electrode connected to a data line DL, and a second electrode connected to a pixel electrode of the liquid crystal layer LC and one side of the capacitor.

One side of the capacitor may be connected to the driving transistor Tr, the other side thereof may be connected to a low-level voltage source (e.g., GND), the pixel electrode of the liquid crystal layer LC may be connected to the driving transistor Tr, and a constant power supply voltage (e.g., GND) may be supplied to a common electrode of the liquid crystal layer LC.

A driving voltage corresponding to a data signal applied to the data line DL of each subpixel SP may be supplied to the pixel electrode of each subpixel SP according to a gate signal applied to the gate line GL of each subpixel SP.

That is, in the display device according to an implementation of the present disclosure, a horizontal electric field can be formed within each subpixel SP by a driving voltage applied to the pixel electrode of the subpixel SP and a power voltage applied to the common electrode. The driving voltage applied to the pixel electrode of each subpixel SP can be maintained for one frame.

The driving transistor Tr of each subpixel SP may generate a driving voltage corresponding to a data signal applied to the subpixel SP according to a gate signal applied to the subpixel SP. The driving transistor Tr of each subpixel SP may be electrically connected to one of the gate lines GL and one of the data lines DL.

The liquid crystal layer LC may include liquid crystals of various modes. For example, the liquid crystal layer LC can be driven in a normally black mode in which the liquid crystal layer LC does not transmit light when no data voltage is applied, or in a normally white mode in which the liquid crystal layer LC transmits light when no data voltage is applied.

The liquid crystal of the liquid crystal layer LC can be rotated by a vertical electric field or a horizontal electric field formed within a relevant subpixel SP according to a gate signal and a data voltage of a data signal.

The liquid crystal layer LC may control the transmittance of light supplied from a backlight source (not shown) according to the magnitude of the applied data voltage, thereby controlling the brightness of light expressed by each subpixel. In this way, each subpixel can display an image according to the magnitude of the data voltage applied to the liquid crystal layer LC.

In addition, although not shown in FIG. 2, a compensation circuit (not shown) for compensating for the threshold voltage of the driving transistor DT may be further provided within the subpixel SP. The compensation circuit may include at least one transistor connected to the driving transistor Tr and may be provided within the subpixel SP.

Although FIG. 2 illustrates an example in which the display panel of the present disclosure is applied to a liquid crystal display (LCD), the display device of the present disclosure is not limited to an LCD. For example, the present disclosure can be applied to an OLED display panel.

Incidentally, the above-described display panel may display a dynamic image in a part of the active area AA and display a still image in the remaining area in the same frame period depending on content. In this case, the display device according to an implementation of the present disclosure can reduce power consumption of the display device by supplying a scan signal having a turn-on voltage to the dynamic image area and supplying a scan signal having a turn-off voltage to the still image area.

To this end, the gate driver 13 according to an implementation of the present disclosure may independently output a carry signal and a scan signal. The gate driver 13 will be described below.

Figure 3:
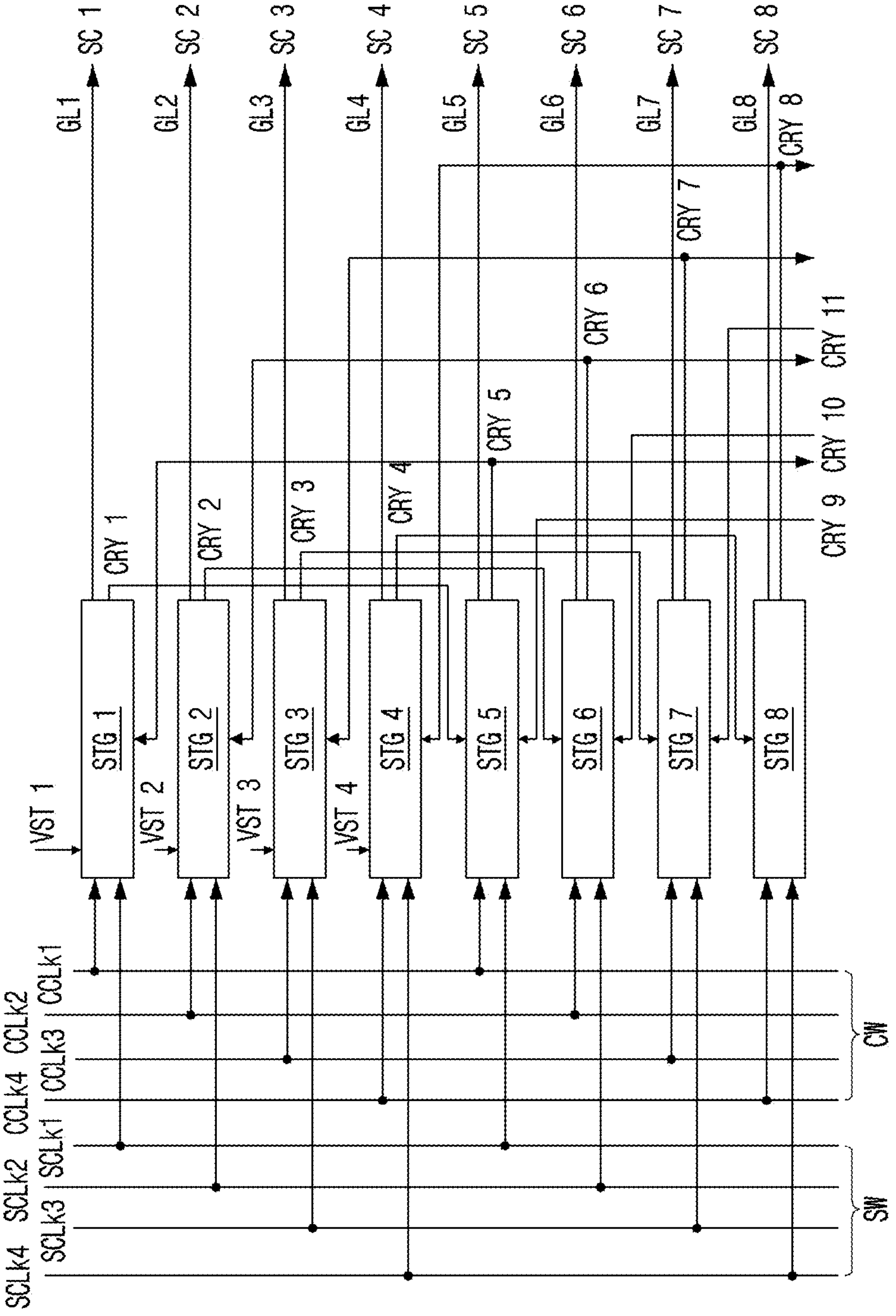
FIG. 3 is a diagram illustrating an example of a gate driver configuration of the present disclosure.

FIG. 3 is a diagram illustrating an example of the configuration of the gate driver of the present disclosure.

As illustrated in FIG. 3, the gate driver 13 according to an implementation of the present disclosure may include a plurality of stages STG1 to STG8. The plurality of stages STG1 to STG8 may be connected in a cascade.

The plurality of stages STG1 to STG8 may be electrically connected to gate lines GL1 to GL8, output carry signals CRY1 to CRY8 according to carry clock signals CCLK1 to CCLK4 applied from the timing controller 11, and sequentially output scan signals SC1 to SC8 to the gate lines according to scan clock signals SCLK1 to SCLK4. That is, the carry clock signals may be used to output the carry signals, and the scan clock signals may be used to output the scan signals.

The plurality of stages STG1 to STG8 may sequentially output the carry signals CRY1 to CRY8. For example, the phase of a turn-on voltage period of the carry signal CRY5 may lag behind the phase of a turn-on voltage period of the carry signal CRY4.

The plurality of stages STG1 to STG8 may sequentially output the scan signals SC1 to SC8 having a turn-on voltage according to previous stage carry signals (CRY(n−4)), and may output the scan signals having a turn-off voltage according to subsequent stage carry signals CRY(n+4). For example, the phase of the turn-on voltage period of the scan signal SC5 may lag behind the phase of the turn-on voltage period of the scan signal SC4.

The scan signals SC1 to SC8 output from the plurality of stages STG1 to STG8 may be supplied to the plurality of subpixels SP within the active area AA through a plurality of gate lines GL1 to GLn.

The carry signals output from some stages (e.g., STG5 to STG8) may be used as a reset signal for resetting the previous stages (e.g., STG1 to STG4) or as a start signal for starting the subsequent stages.

For example, the stage STG5 may receive the preceding carry signal CRY1 of the previous stage STG1, use the same as a start signal, receive the subsequent carry signal CRY9 of the subsequent stage, and use the same as a reset signal. Stages (e.g., STG1 to STG4) that do not receive carry signals from the previous stages may receive external start signals VST1 to VST4.

The plurality of stages may receive carry clock signals (e.g., CCLK1 to CCLK4) through a plurality of carry lines CW and scan clock signals (e.g., SCLK1 to SCLK4) through a plurality of scan lines SW in order to independently output the carry signals CRY1 to CRY8 and the scan signals SC1 to SC8.

The plurality of stages may sequentially receive scan clock signals (e.g., SCLK1 to SCLK4) and carry clock signals (e.g., CCLK1 to CCLK4), and the scan clock signals (e.g., SCLK1 to SCLK4) can be synchronized with the carry clock signals (e.g., CCLK1 to CCLK4).

Although FIG. 3 illustrates an example in which a plurality of carry lines CW and a plurality of scan lines SW are provided on one side of the plurality of stages, the present disclosure is not limited thereto.

For example, in the display device of the present disclosure, the plurality of carry lines CW and the plurality of scan lines SW may be disposed on both sides of the plurality of stages in order to minimize the width of the non-active area NA.

Figure 4:
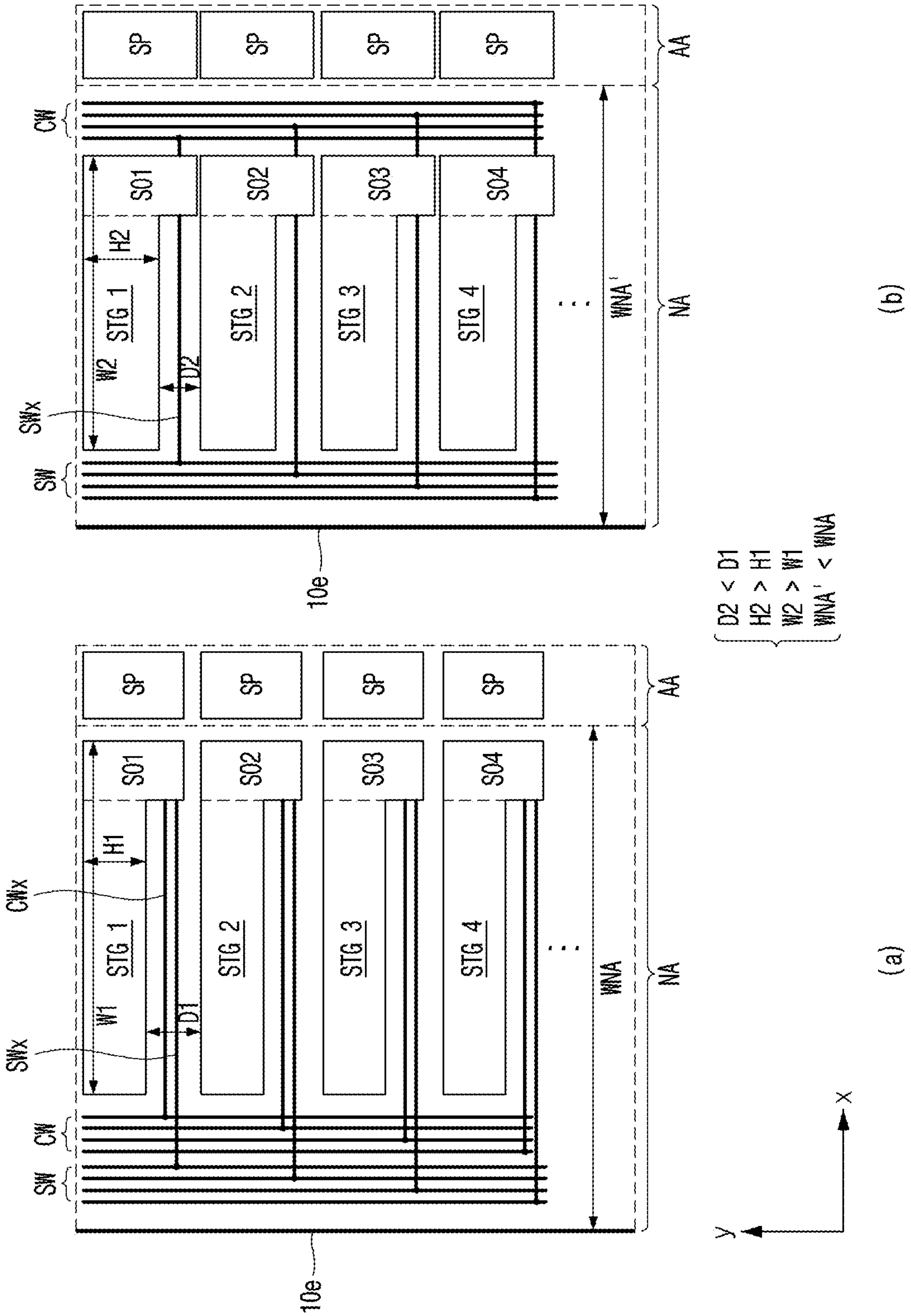
FIG. 4 is a diagram illustrating an example of an arrangement of a plurality of carry lines CW and a plurality of scan lines SW shown in FIG. 3.

FIG. 4 is a diagram illustrating an example of the arrangement of the plurality of carry lines CW and the plurality of scan lines SW illustrated in FIG. 3.

(a) of FIG. 4 illustrates a comparative example of an arrangement of a plurality of carry clock lines CW and scan clock lines SW, and (b) of FIG. 4 illustrates an example of an arrangement of carry clock lines CW and scan clock lines SW according to the present disclosure.

As illustrated in FIG. 4, a plurality of stages (e.g., STG1 to STG4) may be arranged in a row in a second direction y in the non-active area NA, and the scan clock lines SW and the carry clock lines CW may extend along the side of the plurality of stages (e.g., STG1 to STG4) in the second direction y. A plurality of subpixels SP may be positioned in the active area AA adjacent to the plurality of stages (e.g., STG1 to STG4).

The plurality of stages (e.g., STG1 to STG4) may be connected to the plurality of scan clock lines SW through which scan clock signals are supplied and the plurality of carry clock lines CW through which carry clock signals are supplied.

As illustrated in (b) of FIG. 4, in the present disclosure, one line (e.g., SW) of the scan clock lines SW and the carry clock lines CW may be provided on one side of the plurality of stages (e.g., STG1 to STG4), and the other one line (e.g., CW) may be provided on the other side of the plurality of stages (e.g., STG1 to STG4).

For example, as illustrated in (b) of FIG. 4, the scan clock lines SW may be located between an edge line 10*e* of the display panel and the plurality of stages (e.g., STG1 to STG4), and the carry clock lines CW may be located between the plurality of stages (e.g., STG1 to STG4) and the subpixel SP of the active area AA.

The area of each of the stages (STG1 to STG4) in the comparative example illustrated in (a) of FIG. 4 may be the same as the area of each of the stages (STG1 to STG4) in the present disclosure illustrated in (b) of FIG. 4.

As illustrated in FIG. 4, the stages STG1 to STG4 according to the comparative example and the present disclosure may include output parts SO1 to SO4 for supplying scan signals and carry signals adjacent to the active area AA. The output parts SO1 to SO4 may receive scan clock signals and carry clock signals through the scan clock lines SW and the carry clock lines CW.

As shown in the comparative example of (a) of FIG. 4, when the scan clock lines SW and the carry clock lines CW are provided on one side of a plurality of stages (e.g., STG1 to STG4), one carry clock line CWx and one scan clock line SWx extending in a first direction x may be disposed between two stages (e.g., STG1 and STG2) adjacent to each other in the second direction y in order to supply a scan clock signal and a carry clock signal to the output part SO of each stage.

In the case of the comparative example illustrated in (a) of FIG. 4, since one carry clock line CWx and one scan clock line SWx are arranged between two stages (e.g., STG1 and STG2), the gap D1 between the two stages (e.g., STG1 and STG2) increases.

In this case, the length of the display panel in the second direction y is fixed, and each stage may also require a certain area to configure the circuit. Considering this, each stage needs to be designed such that the width H1 thereof in the second direction is relatively small and the width W1 thereof in the first direction is relatively wide, and thus the width WNA of the non-active area in the first direction becomes relatively wide.

However, in the present disclosure illustrated in (b) of FIG. 4, when one SW of the lines is provided on one side of the stages and the other lines CW are provided on the other side of the stages, the number of lines SWx extending in the first direction x between two stages (e.g., STG1 and STG2) adjacent to each other in the second direction y is reduced from two to one, and thus the gap between the two stages (e.g., STG1 and STG2) adjacent to each other can be reduced to D2, which is less than D1.

Accordingly, the width H2 of each stage in the second direction can be designed to be relatively large, and the width W2 thereof in the first direction width can be designed to be relatively narrow, and thus the width of the non-active area NA in the first direction can be reduced from WNA to WNA'.

A plurality of stages (e.g., STG1 to STG4) provided in the gate driver 13 of the present disclosure may independently output scan signals and carry signals. In this case, when a still image and a dynamic image are displayed together in the active area AA, output of scan signals can be reduced, and thus the power consumption of the display device can be reduced.

Figure 5:
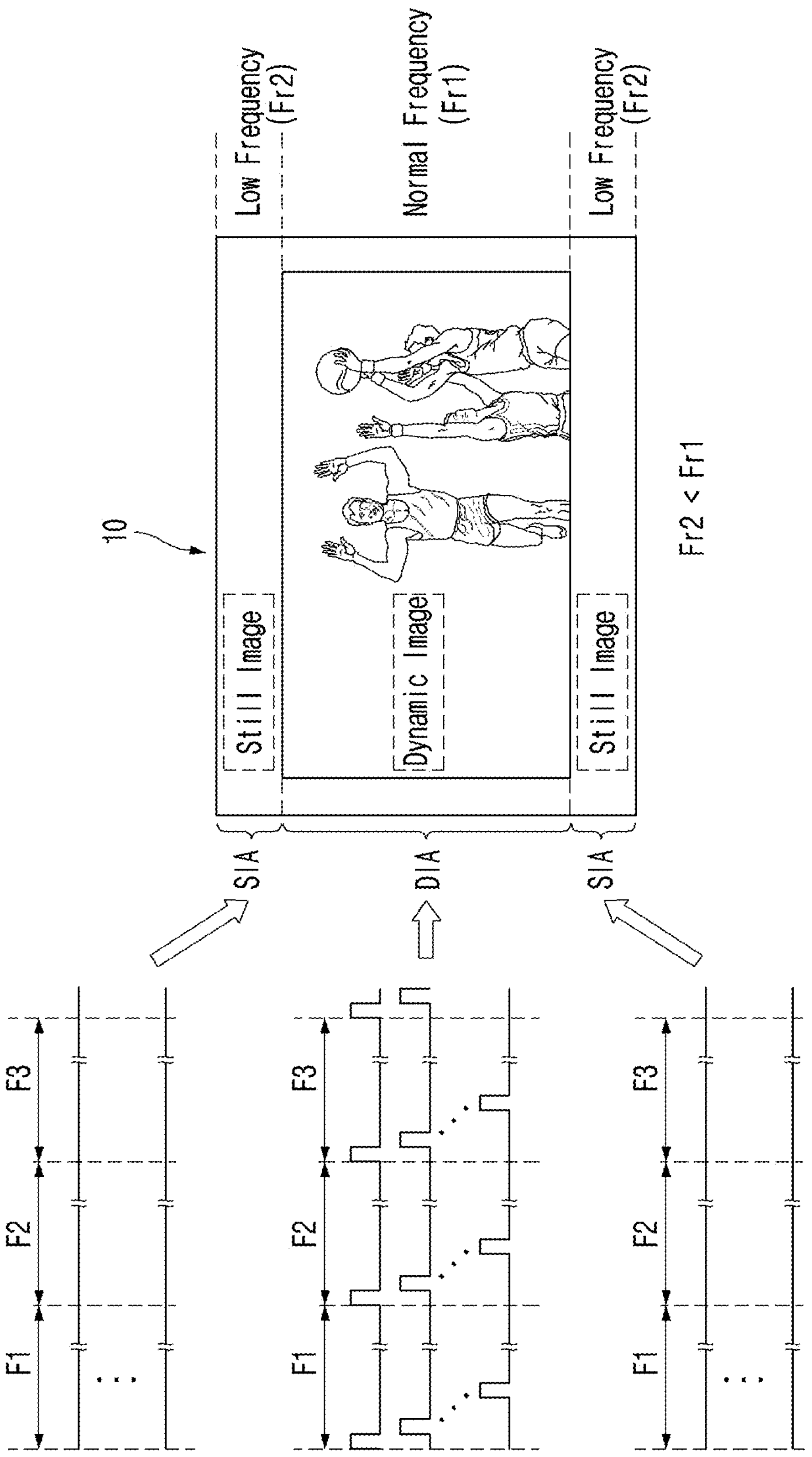
FIG. 5 is a diagram illustrating an example of a case in which a still image and a dynamic image are displayed simultaneously in an active area of a display panel.

FIG. 5 is a diagram illustrating an example of a case in which a still image and a dynamic image are displayed together in the active area of the display panel.

As illustrated in FIG. 5, the display panel 10 of the present disclosure may display both a still image and a dynamic image together. That is, the active area AA may include a dynamic image area DIA in which a dynamic image is displayed during a first frame period (e.g., F1 to F3) and a still image area SIA in which a still image is displayed during the first frame period (e.g., F1 to F3).

For example, as illustrated in FIG. 5, the still image area SIA may be located at the top and bottom of the display panel 10, and the dynamic image area DIA may be located at the center of the display panel 10.

The refresh rate of the dynamic image area DIA may be higher than the refresh rate of the still image area SIA.

For example, images may be refreshed at a first frequency Fr1 in the range of 60 Hz to 240 Hz in the dynamic image area DIA, and images may be refreshed at a second frequency Fr2 lower than Fr1 of the dynamic image area DIA in the still image area SIA.

For example, a dynamic image such as a sports game, news, or a movie may be displayed in the dynamic image area DIA during the first frame period (e.g., F1 to F3), and a still image of a score of the sports game, the title of a news story, or the like may be continuously displayed in the still image area SIA during the first frame period (e.g., F1 to F3).

In this case, scan signals (e.g., SC5 to SCk) having a turn-on voltage may be sustainedly supplied to gate lines of the dynamic image area DIA during the first frame period (e.g., F1 to F3).

However, scan signals (e.g., SC1 to SC4 and SCk+1 to SCn) may not be supplied to gate lines of the still image area SIA during the first frame period (e.g., F1 to F3). That is, scan signals (e.g., SC1 to SC4 and SCk+1 to SCn) having a turn-off voltage may be supplied to the still image area SIA during the first frame period (e.g., F1 to F3), and thus the image of the previous frame may be continuously displayed. Accordingly, the present disclosure can reduce power consumption of the display device.

Figure 6:
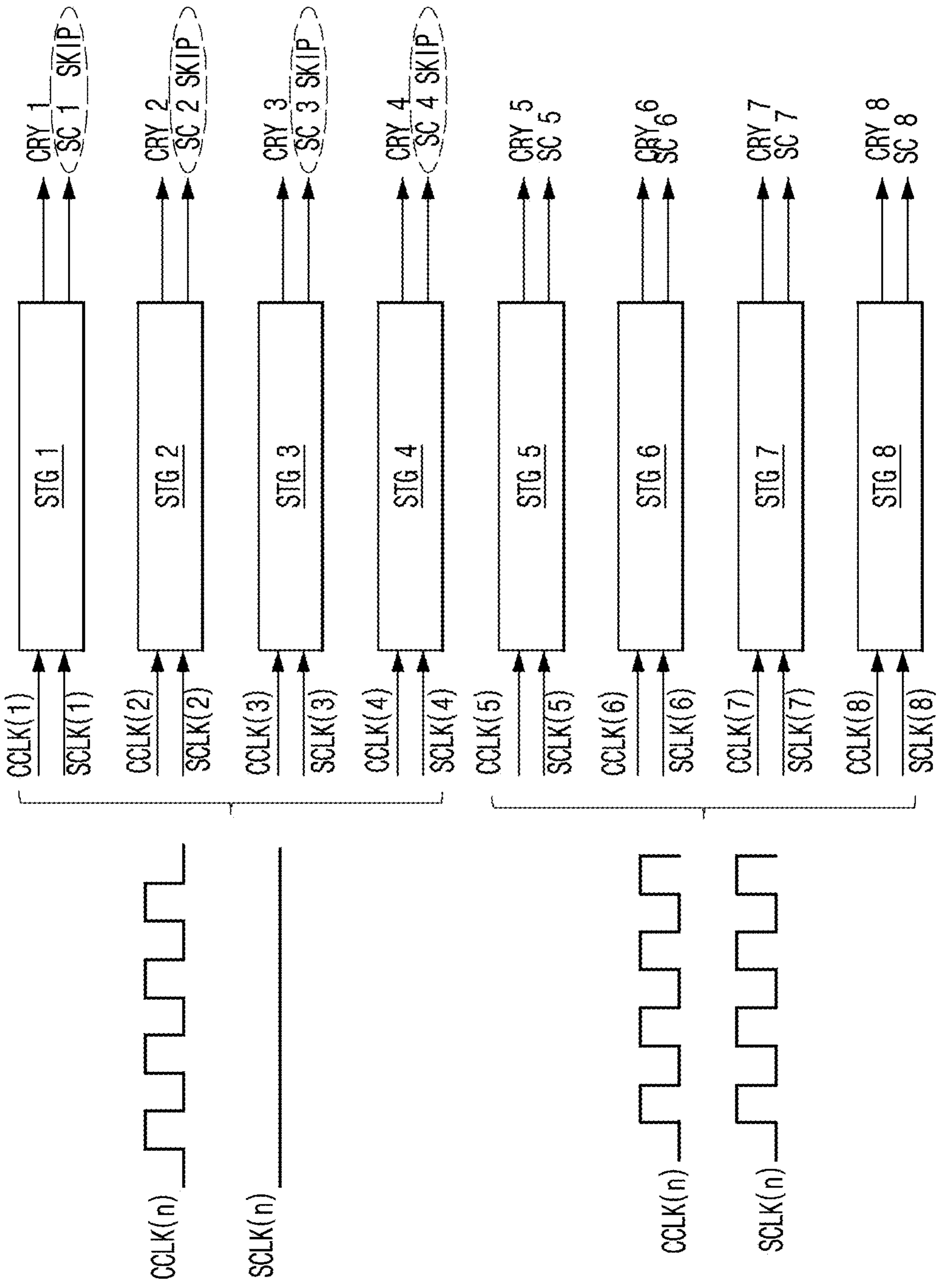
FIG. 6 is a diagram illustrating an example in which a plurality of stages of the present disclosure outputs scan signals and carry signals to a still image area and a dynamic image area shown in FIG. 5.

FIG. 6 is a diagram illustrating an example in which the plurality of stages of the present disclosure outputs scan signals and carry signals to the still image area and the dynamic image area shown in FIG. 5.

As illustrated in FIG. 5, when the display panel 10 displays a dynamic image and a still image together during the first frame period (e.g., F1 to F3), first stages (e.g., STG5 to STG8) corresponded to the dynamic image DIA can supply scan signals (e.g., SC5 to SC8), and second stages (e.g., STG1 to STG4) corresponded to the still image area SIA can skip output of scan signals (e.g., SC1 to SC4).

More specifically, during the first frame period (e.g., F1 to F3), the first stages (e.g., STG5 to STG8) may output scan signals (e.g., SC5 to SC8) having a turn-on voltage to the dynamic image area DIA such that the dynamic image can be changed at the first frequency Fr1, and output carry signals having a turn-on voltage such that the scan signals can be sequentially input to the gate lines within one frame.

During the first frame period (e.g., F1 to F3), the second stages (e.g., STG1 to STG4) may skip output of scan signals having the turn-on voltage to the still image area SIA SC1 to SC4 such that the still image can be maintained. When the output of the scan signals having the turn-on voltage is skipped, scan signals having the turn-off voltage can be output.

Additionally, during the first frame period (e.g., F1 to F3), the second stages (e.g., STG1 to STG4) may output carry signals CRY1 to CRY4 having a turn-on voltage such that the subsequent stages can sequentially output scan signals to the gate lines at a predetermined timing within one frame.

For example, as the second stages STG1 to STG4 sequentially output carry signals CRY1 to CRY4, the first stage STG5 located at the rear end of the second stages can also output a scan signal SC5 having the turn-on voltage according to the timing determined by the carry signal CRY1. Thereafter, the second stages STG6 to STG8 can also sequentially output scan signals having the turn-on voltage according to the timing determined by the carry signals CRY2 to CRY4.

To this end, in the first frame period, the first stages (e.g., STG5 to STG8) may receive carry clock signals and scan clock signals. For example, the first stages (e.g., STG5 to STG8) can receive carry clock signals CCLK5 to CCLK8 having a turn-on voltage and scan clock signals SCLK5 to SCLK8 having a turn-on voltage.

The second stages (e.g., STG1 to STG4) may receive carry clock signals having the turn-on voltage and may not receive scan clock signals having the turn-on voltage. That is, scan clock signals having a turn-off voltage can be input to the second stages.

For example, the second stages (e.g., STG1 to STG4) may receive carry clock signals CCLK1 to CCLK4 having the turn-on voltage and scan clock signals SCLK1 to SCLK4 having the turn-off voltage.

In this way, the plurality of stages (e.g., STG1 to STG4) according to the present disclosure can reduce power consumption of the display device by supplying scan signals to the dynamic image area DIA and supplying no scan signal to the still image area SIA.

Hereinafter, the configuration of any one of the plurality of stages (e.g., STG1 to STG4) will be described.

Figure 7:
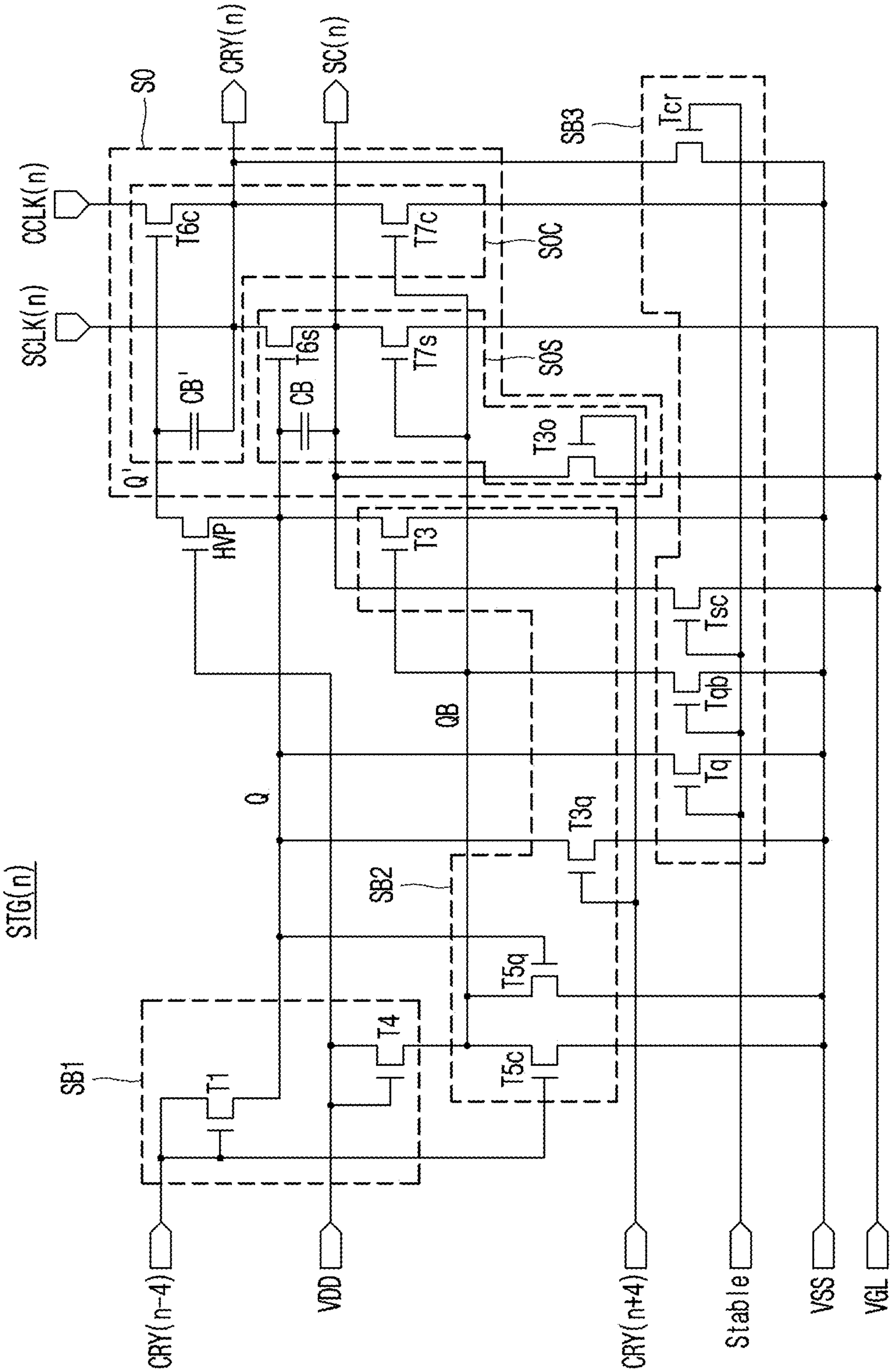
FIG. 7 is a diagram illustrating an example of a configuration of one of the plurality of stages according to the present disclosure.

FIG. 7 is a diagram illustrating an example of the configuration of one of the plurality of stages according to the present disclosure.

As illustrated in FIG. 7, an example of a stage according to the present disclosure may include a charging part SB1, a discharging part SB2, an output part SO, a stabilizer SB3, and a protection transistor HVP.

In FIG. 7, the charging part SB1, the discharging part SB2, the output part SO, and the protection transistor HVP may operate during a display time of a first frame frame1, and the stabilizer SB3 may operate in a blank period of the first frame frame1.

The charging part SB1 may control supply of a turn-on voltage to a node Q, a node Q', and a node QB during the display time of the first frame frame1. To this end, the charging part SB1 may include a transistor T1 and a transistor T4.

The transistor T1 may supply the turn-on voltage to the node Q and the node Q' according to a previous carry signal CRY(n−4), and includes a gate electrode and a first electrode to which the previous carry signal CRY(n−4) is applied, and a second electrode connected to the node Q.

The transistor T4 may supply the turn-on voltage to the node QB according to a display driving signal VDD, and the transistor T4 includes a gate electrode and a first electrode to which the display driving signal VDD is applied, and a second electrode connected to the QB node.

The discharging part SB2 may control supply of a turn-off voltage to the node Q, the node Q', and the node QB. To this end, the discharging part SB2 may include transistors T5*c*, T5*q*, T3*q*, and T3.

The transistor T5*c* may supply a first low voltage VSS to the node QB according to the previous carry signal CRY(n−4), and the transistor T5*c* includes a gate electrode to which the previous carry signal CRY(n−4) is applied, a first electrode to which the first low voltage VSS is applied, and a second electrode connected to the node QB.

The transistor T5$q$ may supply the first low voltage VSS to the node QB according to the voltage of the node Q, and the transistor T5$q$ includes a gate electrode to which the voltage of the node Q is applied, a first electrode to which the first low voltage VSS is applied, and a second electrode connected to the node QB.

The transistor T3$q$ may supply the first low voltage VSS to the node Q according to a subsequent carry signal CRY(n+4), and the transistor T3$q$ includes a gate electrode to which the subsequent carry signal CRY(n+4) is applied, a first electrode to which the first low voltage VSS is applied, and a second electrode connected to the node Q.

The transistor T3 may supply the first low voltage VSS to the node Q according to the voltage of the node QB, and the transistor T3 includes a gate electrode connected to the node QB, a first electrode to which the first low voltage VSS is applied, and a second electrode connected to the node Q.

The output part SO may control output of a scan signal SC(n) according to the voltages of the node Q and the node QB during the display time of the first frame frame1, and may control output of a carry signal CRY(n) according to the voltages of the node Q' and the node QB. The output part SO may include a scan output part SOS and a carry output part SOC in order to independently operate the scan signal SC(n) and the carry signal CRY(n).

The scan output part SOS may control output of the scan signal SC(n) having a turn-on voltage according to the voltage of the node Q in response to input of a scan clock signal SCLK(n) during the display time of the first frame frame1.

The carry output part SOC may control output of the carry signal CRY(n) having the turn-on voltage according to the voltage of the node Q' in response to input of the carry clock signal CCLK(n) during the display time of the first frame frame1.

In addition, the scan output part SOS and the carry output part SOC may control output of the scan signal SC(n) having the turn-off voltage or the carry signal CRY(n) having the turn-off voltage according to the voltage of the node QB.

The scan output part SOS may include a first capacitor CB and transistors T6$s$, T7$s$, and T30.

The first capacitor CB can bootstrap the scan clock signal SCLK(n), and one end thereof is connected to the node Q and the other end thereof is connected to a scan output terminal.

The transistor Tos may output the scan clock signal SCLK(n) according to the voltage of the node Q, and include a gate electrode connected to the node Q, a first electrode to which the scan clock signal SCLK(n) is input, and a second electrode connected to the scan output terminal.

The transistor T7$s$ may output a second low voltage VGL according to the voltage of the node QB, and include a gate electrode connected to the node QB node, a first electrode to which the second low voltage VGL is applied, and a second electrode connected to the scan output terminal.

The transistor T30 may output the second low voltage VGL to the scan output terminal according to the subsequent carry signal CRY(n+4), and include a gate electrode to which the subsequent carry signal CRY(n+4) is applied, a first electrode to which the first low voltage VSS is applied, and a second electrode connected to the scan output terminal.

The carry output part SOC may include a second capacitor CB' and transistors T6$c$ and T7$c$.

The second capacitor CB' can bootstrap the carry clock signal CCLK(n), and one end thereof is connected to the node Q' and the other end thereof is connected to a carry output terminal.

The transistor T6$c$ may output the carry clock signal CCLK(n) according to the voltage of the node Q', and include a gate electrode connected to the node Q', a first electrode to which the carry clock signal CCLK(n) is applied, and a second electrode connected to the carry output terminal.

The transistor T7$c$ may output the first low voltage VSS according to the voltage of the node QB, and include a gate electrode connected to the node QB, a first electrode to which the first low voltage VSS is applied, and a second electrode connected to the carry output terminal.

Here, the first low voltage VSS and the second low voltage VGL may be the same or different from each other, and for example, the first low voltage VSS may be lower than the second low voltage VGL.

The stabilizer SB3 may be turned off during the display time of the first frame frame1 and turned on in the blank period to operate. In the blank period, the stabilizer XB3 may supply a turn-off voltage to the node Q, the node Q', and the node QB, and may supply the turn-off voltage to the carry output terminal and the scan output terminal.

The stabilizer SB3 may include transistors Tq, Tqb, Tsc, and Tcr. The transistors Tq, Tqb, Tsc, and Ter may be turned off during the display time and turned on in the blank period.

The transistors Tq, Tqb, Tsc, and Tcr may supply the first and second low voltages VSS and VGL to the node Q, the node QB, the scan output terminal, and the carry output terminal according to a stable signal Stable to discharge the node Q and the node QB during the blank period to remove the remaining charge, and allow the scan output terminal and carry output terminal to stably maintain a low voltage.

The transistor Tq may include a gate electrode to which the stable signal Stable is applied, a first electrode to which the first low voltage VSS is applied, and a second electrode connected to the node Q.

The transistor Tqb may include a gate electrode to which the stable signal Stable is applied, a first electrode to which the first low voltage VSS is applied, and a second electrode connected to the node QB.

The transistor Tsc may include a gate electrode to which the stable signal Stable is applied, a first electrode to which the second low voltage VGL is applied, and a second electrode connected to the scan output terminal.

The transistor Ter may include a gate electrode to which the stable signal Stable is applied, a first electrode to which the first low voltage VSS is applied, and a second electrode connected to the carry output terminal.

The protection transistor HVP is connected between the node Q and the node Q' and may electrically connect the node Q and the node Q' to each other during the display time. The protection transistor HVP may operate differently depending on whether a relevant stage outputs a scan signal SC(n) during the display time.

Specifically, when the stages shown in FIG. 7 operate as first stages (e.g., STG5 to STG8 in FIG. 6) driving a dynamic image area DIA, the protection transistor HVP may be turned on during the display time of the first frame frame1.

In addition, when the stages shown in FIG. 7 operate as second stages (e.g., STG1 to STG4 in FIG. 6) driving a still image area SIA, the protection transistor HVP may be turned off during the display time of the first frame frame1. For example, when the stages shown in FIG. 7 operate as second stages (e.g., STG1 to STG4 in FIG. 6) driving a still image area SIA, the protection transistor HVP may be turned off while the node Q' is bootstrapped in response to input of the carry clock signal CCLK(n) during the display time of the first frame frame1.

The present disclosure can prevent breakdown that may occur in the transistor Tos of a second stage by turning off the protection transistor HVP while the node Q' is bootstrapped in the stages of FIG. 7 when the stages in FIG. 7 operate second stages (e.g., STG1 to STG4 in FIG. 6) driving a still image area SIA, thereby preventing damage to the transistor T6*s*. This will be described in more detail with reference to FIG. 16.

Hereinafter, timing charts showing operations of the stages illustrated in FIG. 7 will be described with reference to FIG. 8 and FIG. 9.

Figure 8:
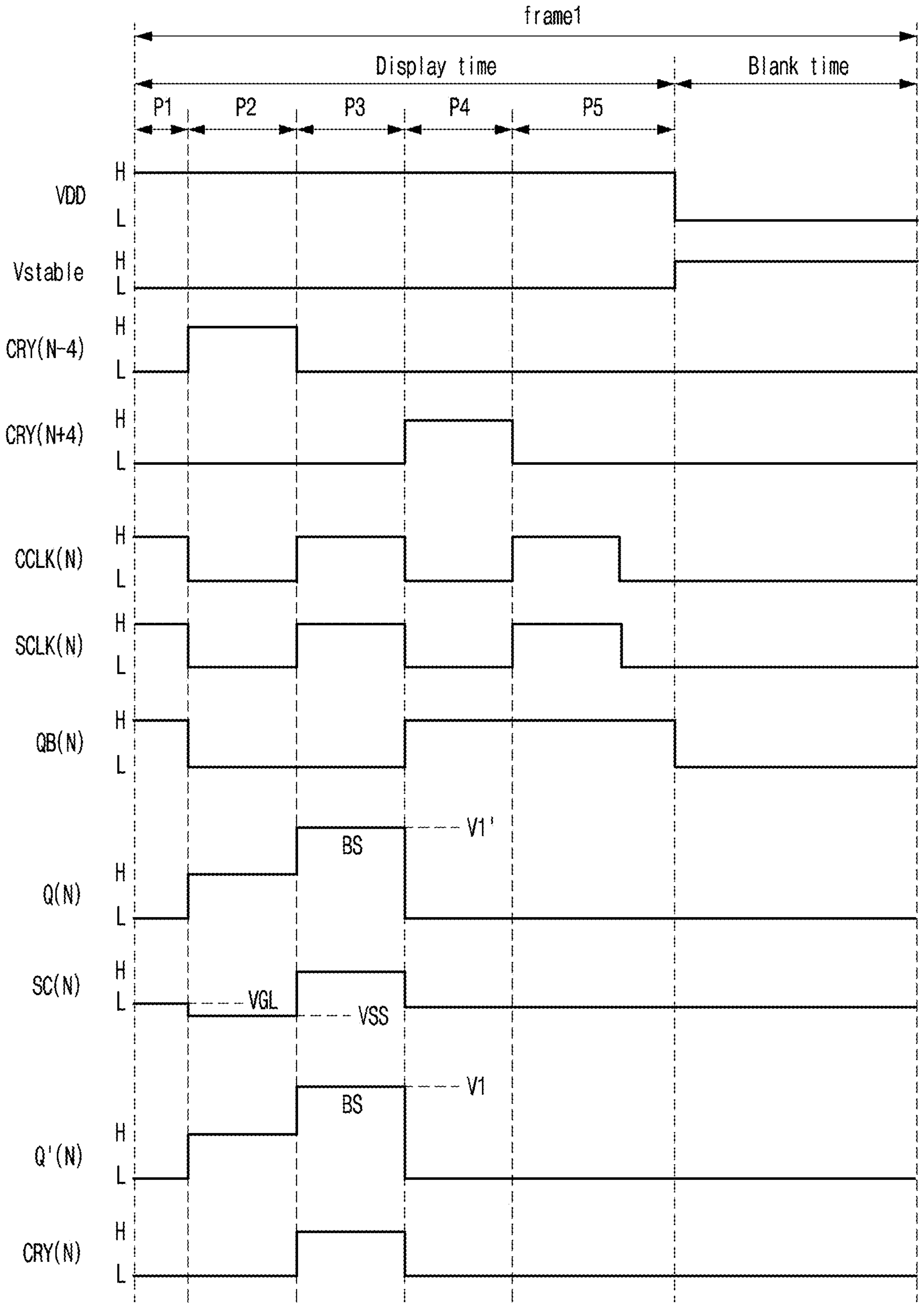
FIG. 8 is a diagram illustrating an example of a timing chart showing operations of the stages shown FIG. 7 driving a dynamic image area.
Figure 9:
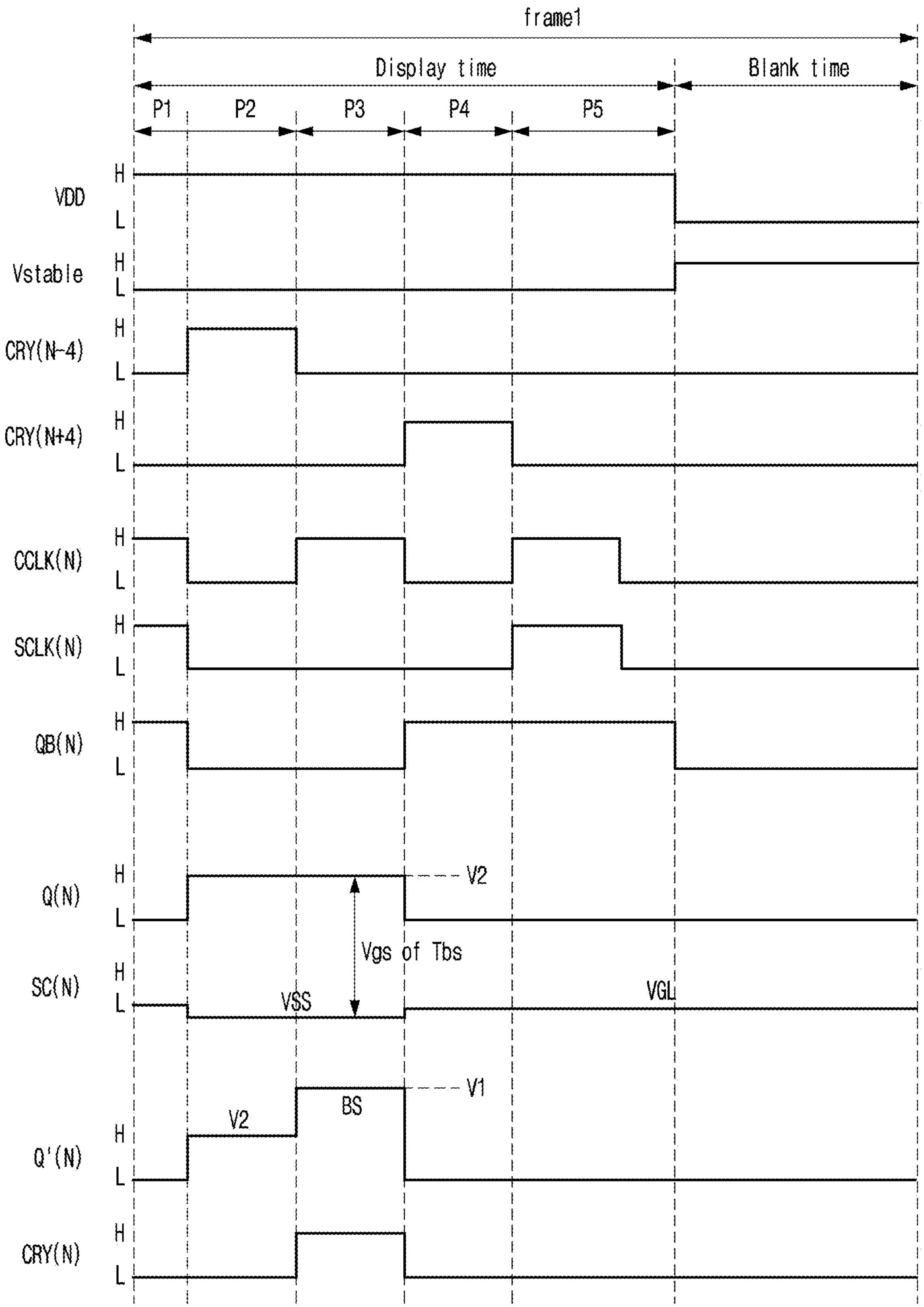
FIG. 9 is a diagram illustrating a timing chart showing operations of the stages shown in FIG. 9 driving a still image area.
Figure 10:
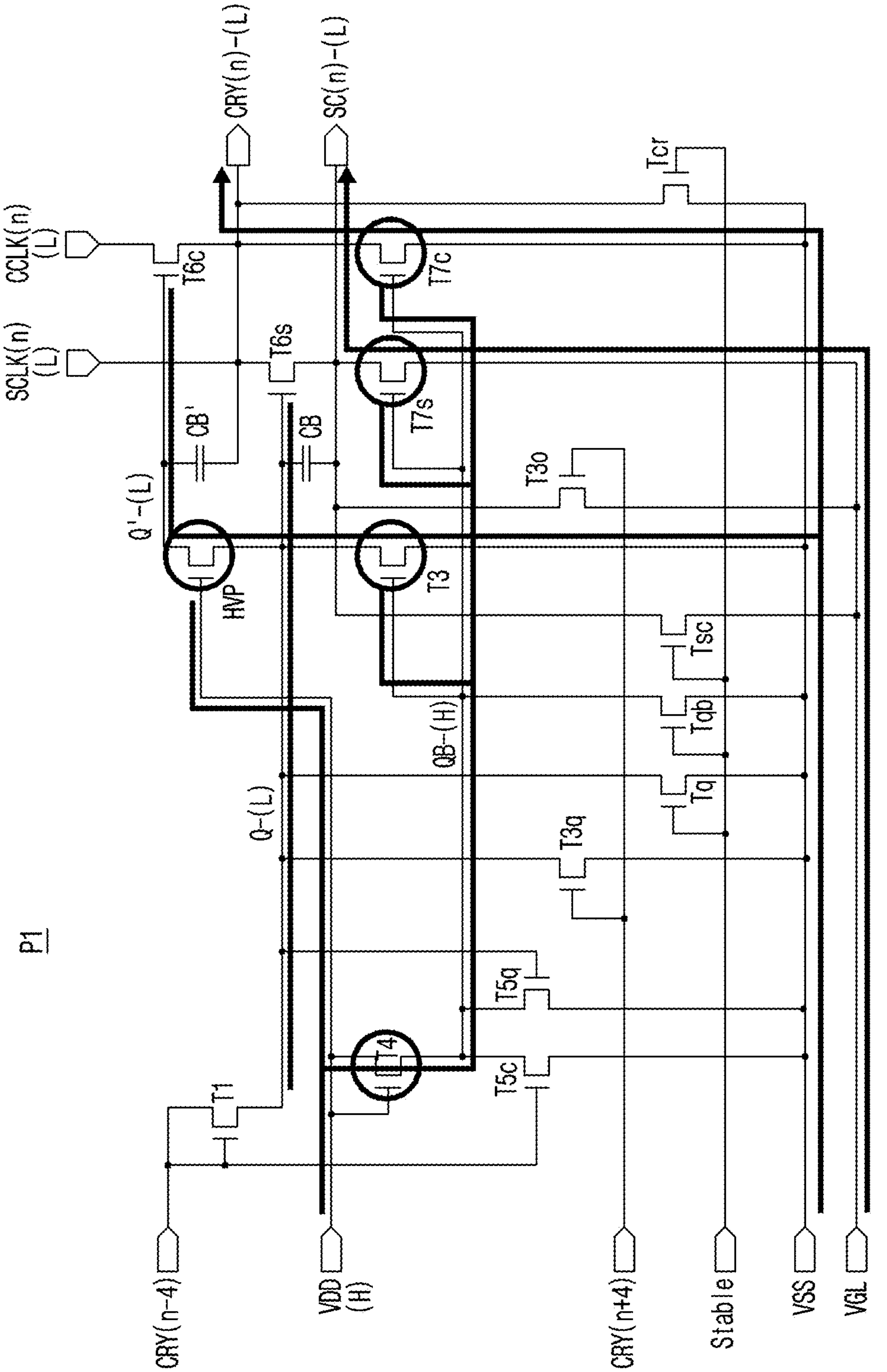
FIG. 10 to FIG. 15 are diagrams illustrating an operation method of first stages for driving a dynamic image area according to the timing chart of FIG. 8.
Figure 11:
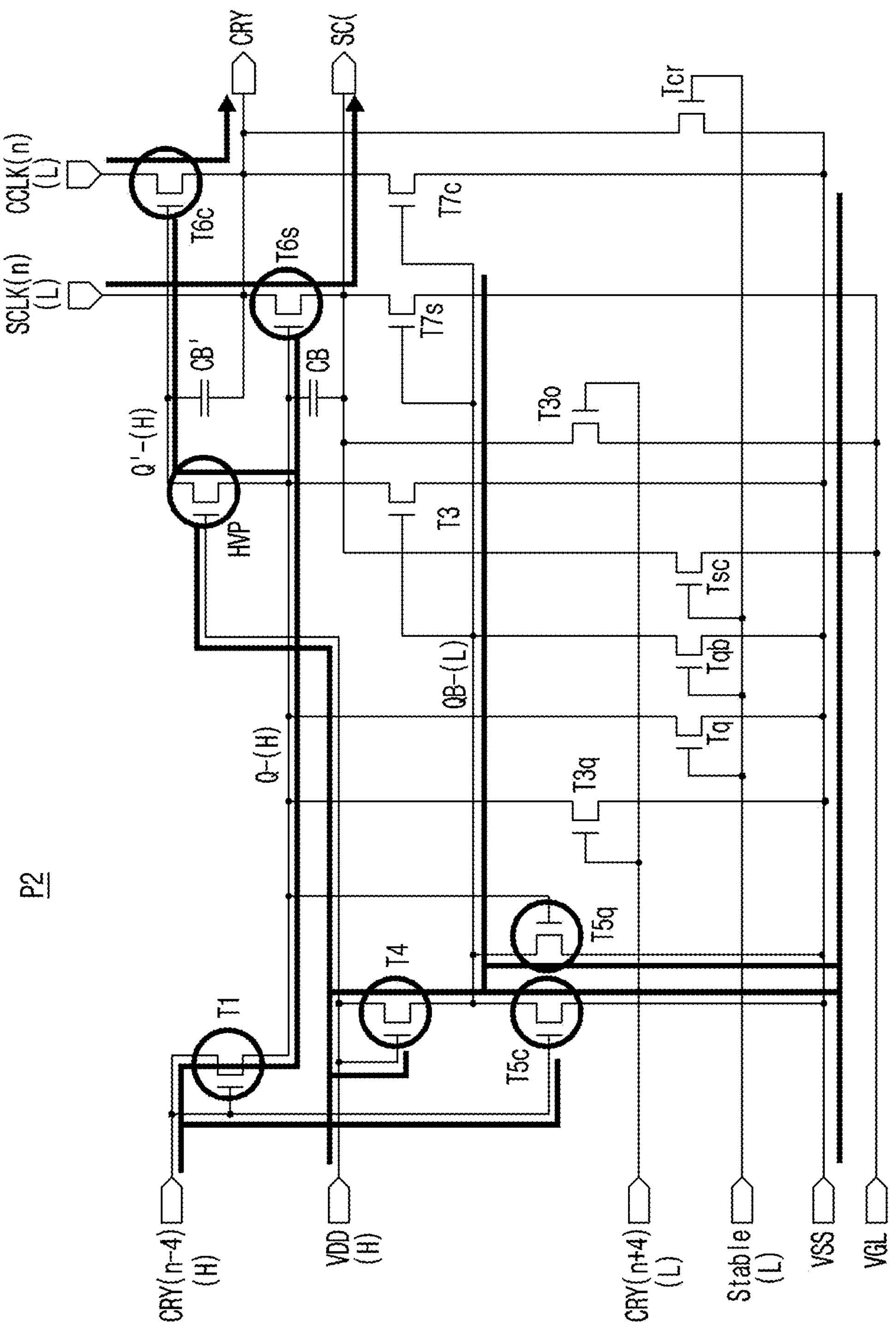
Figure 12:
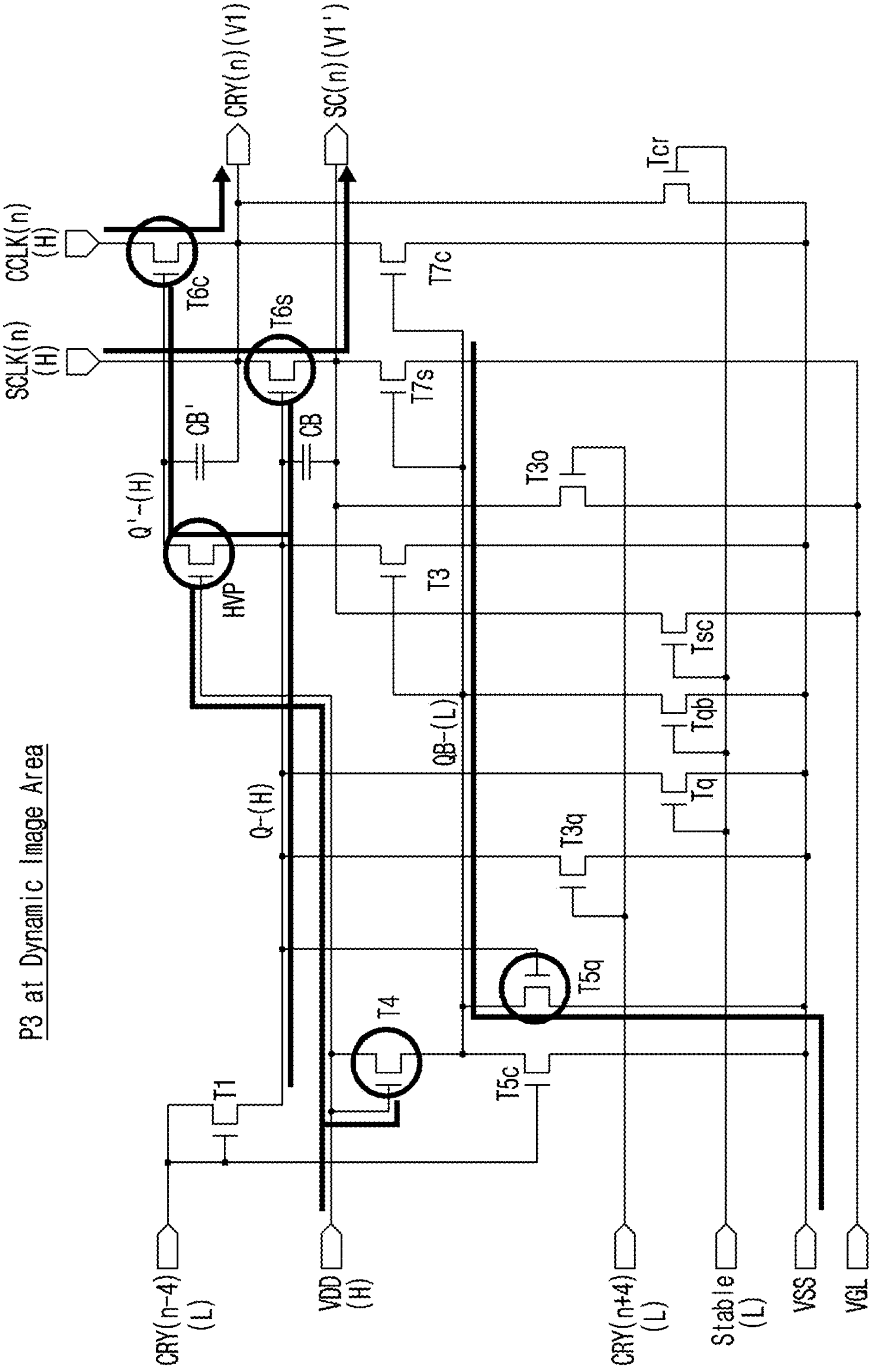
Figure 13:
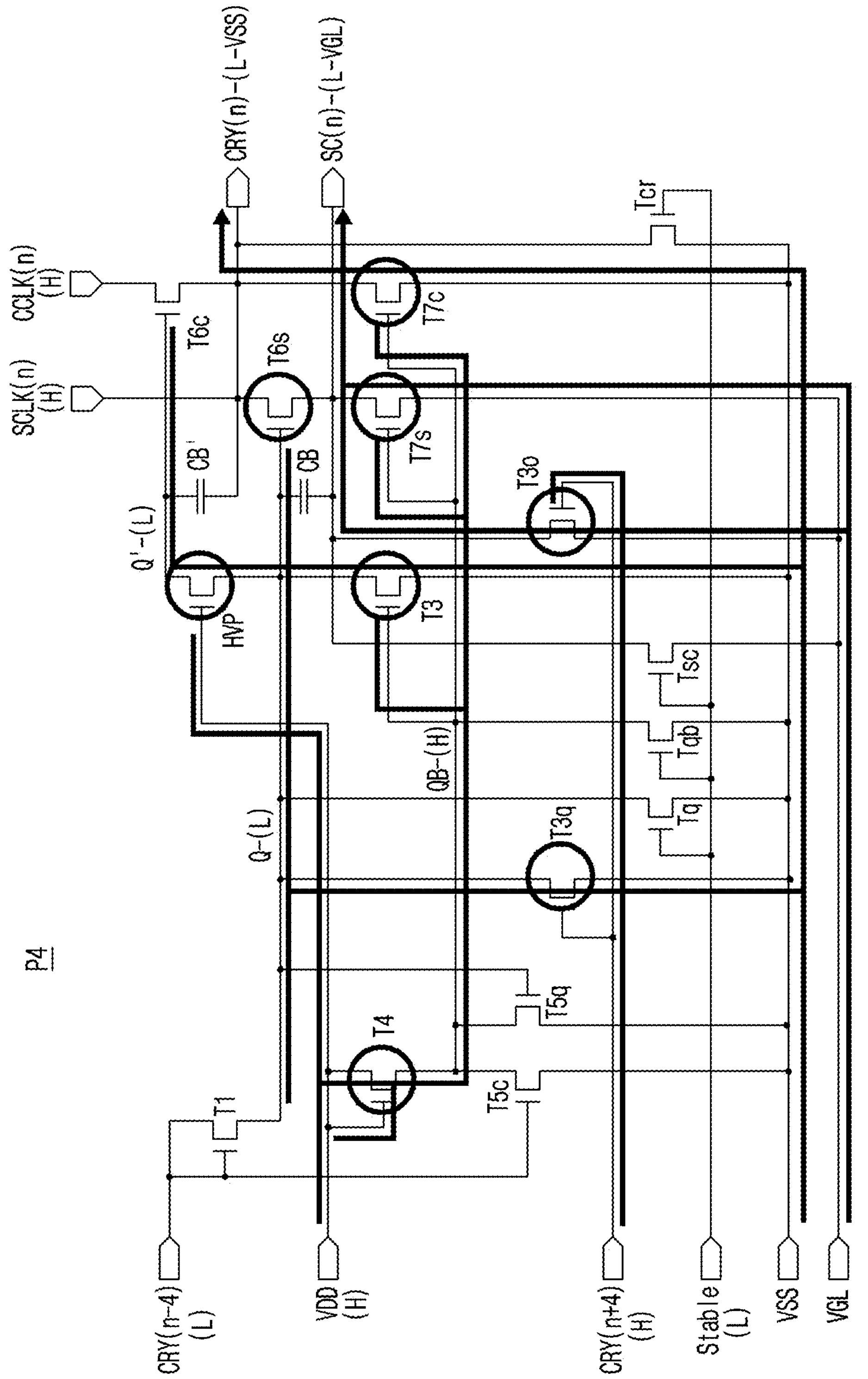
Figure 14:
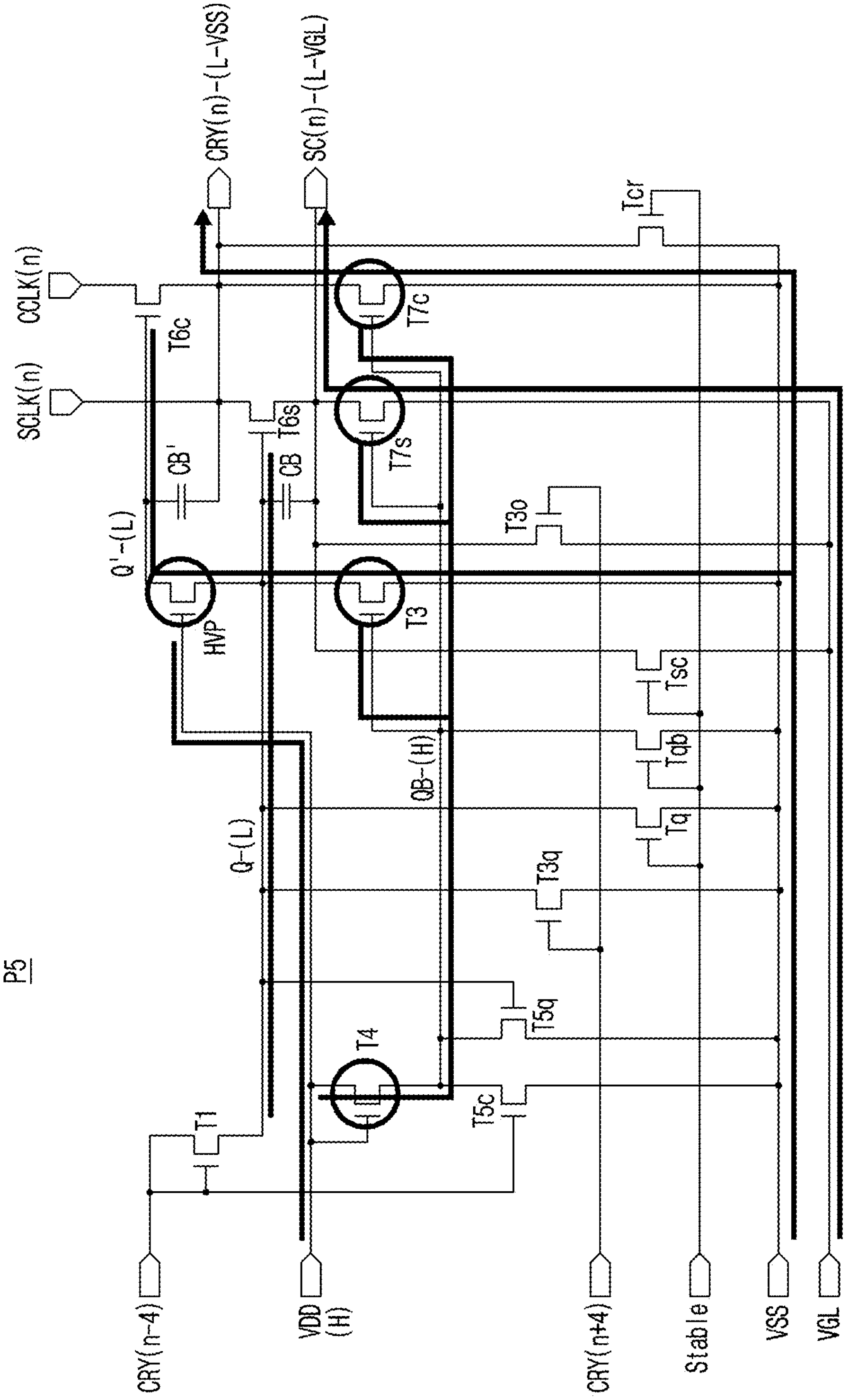
Figure 15:
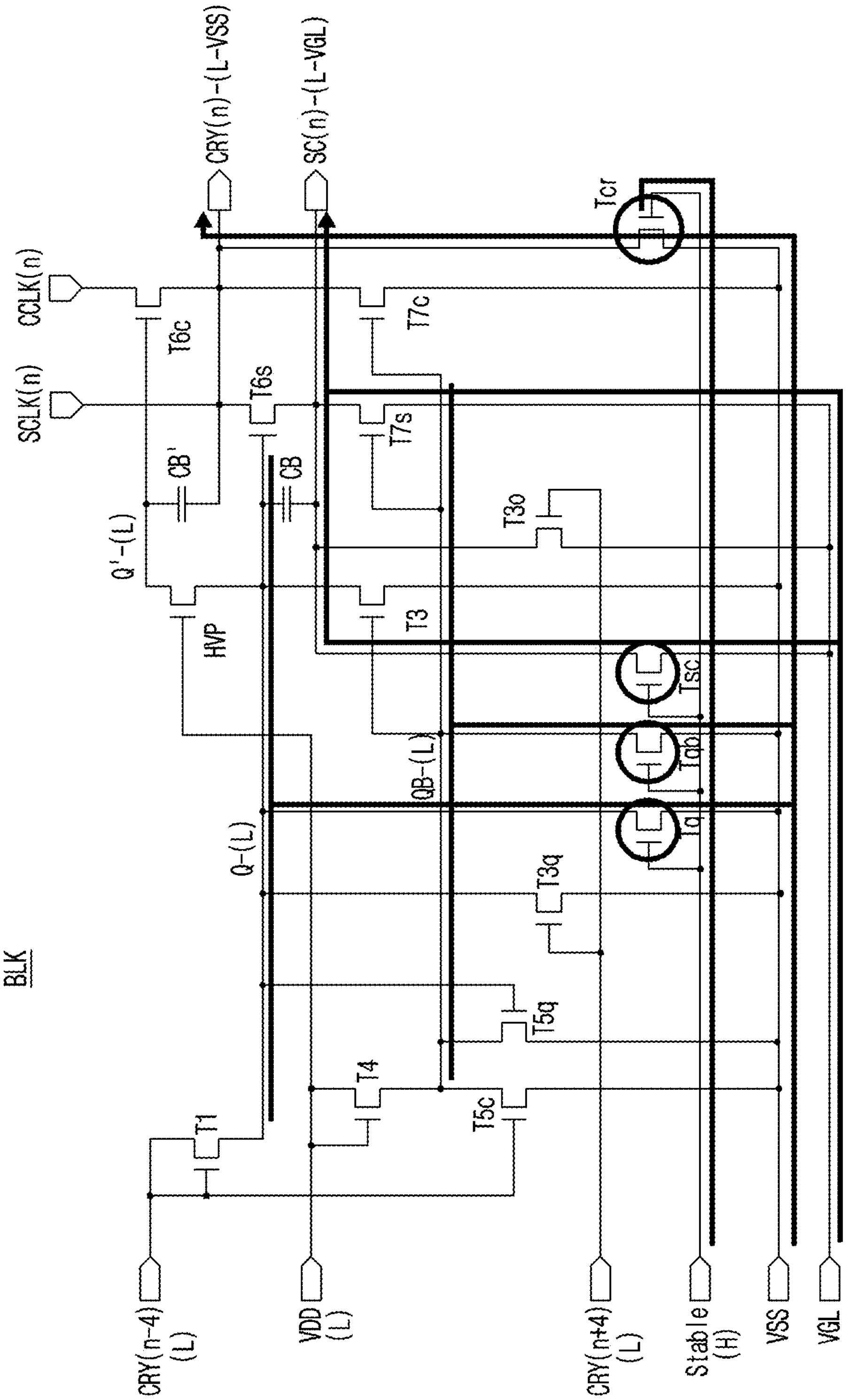

FIG. 8 is a diagram illustrating an example of a timing chart showing operations of stages illustrated in FIG. 7 driving a dynamic image area, and FIG. 9 is a diagram illustrating an example of a timing chart showing operations of the stages illustrated in FIG. 7 driving a still image area.

Although FIG. 8 and FIG. 9 illustrate an example of a case in which a turn-on voltage H is a gate high voltage and a turn-off voltage L is a gate low voltage, the present disclosure is not necessarily limited thereto. For example, unlike FIG. 7, if a plurality of transistors provided in a stage is p-type, the turn-on voltage may be the gate low voltage and the turn-on voltage may be the gate high voltage.

Since a case in which the plurality of transistors provided in the stage of FIG. 7 is n-type is illustrated as an example, FIG. 8 and FIG. 9 illustrate a case in which the turn-on voltage H is the gate high voltage VGH and the turn-off voltage L is the gate low voltage VGL.

As illustrated in FIG. 8 and FIG. 9, the first frame frame1 may include a display time and a blank period.

During the display time, a scan signal SC(n) and a carry signal CRY(n) which have a turn-on voltage may be output such that an image displayed in the active area AA can be refreshed.

In the blank period, the scan signal SC(n) and the carry signal CRY(n) having the turn-on voltage may not be output, and the image may be maintained during the display time.

When the stages shown in FIG. 7 according to an example of the present disclosure drive a dynamic image area DIA, both the scan signal SC(n) and the carry signal CRY(n) which have the turn-on voltage may be output such that images can be refreshed as shown in FIG. 8.

However, when the stages of the present disclosure drive a still image area SIA, the carry signal CRY(n) having the turn-on voltage may be output but the scan signal SC(n) having the turn-on voltage may not be output during the display time, as shown in FIG. 9. That is, the stages shown in FIG. 7 according to the present disclosure may output the carry signal CRY(n) having the turn-on voltage to the still image area SIA and output the scan signal SC(n) having a turn-off voltage during the display time.

Therefore, FIG. 8 is a timing chart when the stages shown in FIG. 7 operate as the first stages (e.g., STG 5 to STG8 of FIG. 6) driving the dynamic image area DIA, and FIG. 9 is a timing chart when the stages shown in FIG. 7 operate as the second stages (e.g., STG1 to STG4 of FIG. 6) driving the still image area SIA.

As shown in FIG. 8 and FIG. 9, the display time may include an initialization period P1, a turn-on period P2, an output period P3, a turn-off period P4, and a sustain period P5.

The display driving signal VDD may have a turn-on voltage H in the initialization period P1, the turn-on period P2, the output period P3, the turn-off period P4, and the sustain period P5 of the display time and may have a turn-off voltage L in the blank period.

The stable signal Stable may have a turn-off voltage L in the initialization period P1, the turn-on period P2, the output period P3, the turn-off period P4, and the sustain period P5 of the display time, and may have a turn-on voltage H in the blank period.

In the initialization period P1, the turn-off voltage L may be supplied to the node Q and the node Q' and the turn-on voltage H may be supplied to the node QB according to the turn-on voltage H of the display driving signal VDD. The scan output terminal and the carry output terminal may output the carry signal CRY(n) and the scan signal SC(n) having the turn-off voltage L according to the turn-on voltage H of the node QB.

In the turn-on period P2, the turn-off voltage L may be supplied to the node QB and the turn-on voltage H may be supplied to the node Q and the node Q' according to the turn-on voltage H of the previous carry signal CRY(n−4). The transistors provided in the scan output terminal and the carry output terminal may be turned on by the turn-on voltage H of the node Q and the node Q', and the scan output terminal and the carry output terminal may output the scan signal SC(n) and the carry signal CRY(n) having the turn-off voltage L.

In a case where the stages shown in FIG. 7 operate as the first stages (e.g., STG 5 to STG8 in FIG. 6) driving the dynamic image area DIA, as in the output period P3 of FIG. 8, the node Q may be bootstrapped by the turn-on voltage H of the scan clock signal SCLK(n), and thus the scan output terminal can output a scan signal SC(n) having the bootstrapped voltage V1', and the node Q' is bootstrapped by the turn-on voltage H of the carry clock signal CCLK(n), and thus the carry output terminal can output a carry signal CRY(n) having the bootstrapped voltage V1.

In the output period P3 of FIG. 8, since the node Q and the node Q' are bootstrapped together, the node Q' and the node Q may have similar voltages. As in the output period P3 of FIG. 8, the protection transistor HVP can be kept turned on while the node Q and the node Q' are bootstrapped together.

In a case where the stages shown in FIG. 7 operate as the second stages (e.g., STG1 to STG4 in FIG. 6) driving the still image area SIA, in the output period P3 of FIG. 9, the carry clock signal CCLK(n) having the turn-on voltage H is input, but the scan clock signal SCLK(n) having the turn-on voltage H is not input, and the scan clock signal SCLK(n) having the turn-off voltage (L) may be input.

Accordingly, in the output period P3 of FIG. 9, the node Q' is bootstrapped by the turn-on voltage H of the carry clock signal CCLK(n), and thus the carry output terminal can output the carry signal CRY(n) having the bootstrapped voltage V1. At this time, the protection transistor HVP is turned off, and thus the node Q may not be bootstrapped by the scan clock signal SCLK(n) having the turn-off voltage L, and the scan output terminal may output the first low voltage VSS which is the turn-off voltage L.

When the stages shown in FIG. 7 operate as the second stages (e.g., STG1 to STG4 in FIG. 6) driving the still image area SIA, the voltage V1 of the node Q' may become higher than the voltage V2 of the node Q while the node Q' is bootstrapped as in the output period P3 of FIG. 9. When the node Q' has a voltage V1 higher than the voltage V2 of the node Q, the protection transistor HVP is turned off.

In the turn-off period P4, the turn-on voltage H may be supplied to the node QB according to the turn-on voltage H of the subsequent carry signal CRY(n+4), and the turn-off voltage L may be supplied to the node Q and the node Q'. The scan output terminal and the carry output terminal may output the scan signal SC(n) and the carry signal CRY(n) having the turn-off voltage L according to the turn-on voltage H of the node QB.

In the sustain period P5, the subsequent carry signal CRY(n+4) has the turn-off voltage L and the turn-off voltage L of the node Q and the node Q' and the turn-on voltage H of the node QB are maintained, and thus the scan output terminal and the carry output terminal may output the scan signal SC(n) and the carry signal CRY(n) having the turn-off voltage L.

Thereafter, in the blank period, the display driving signal VDD may have the turn-off voltage L and the stable signal Stable may have the turn-on voltage H. Accordingly, the turn-off voltage L is supplied to the node Q, the node Q', and the node QB, and the carry output terminal and the scan output terminal may output the scan signal SC(n) and the carry signal CRY(n) having the turn-off voltage L.

Figure 16:
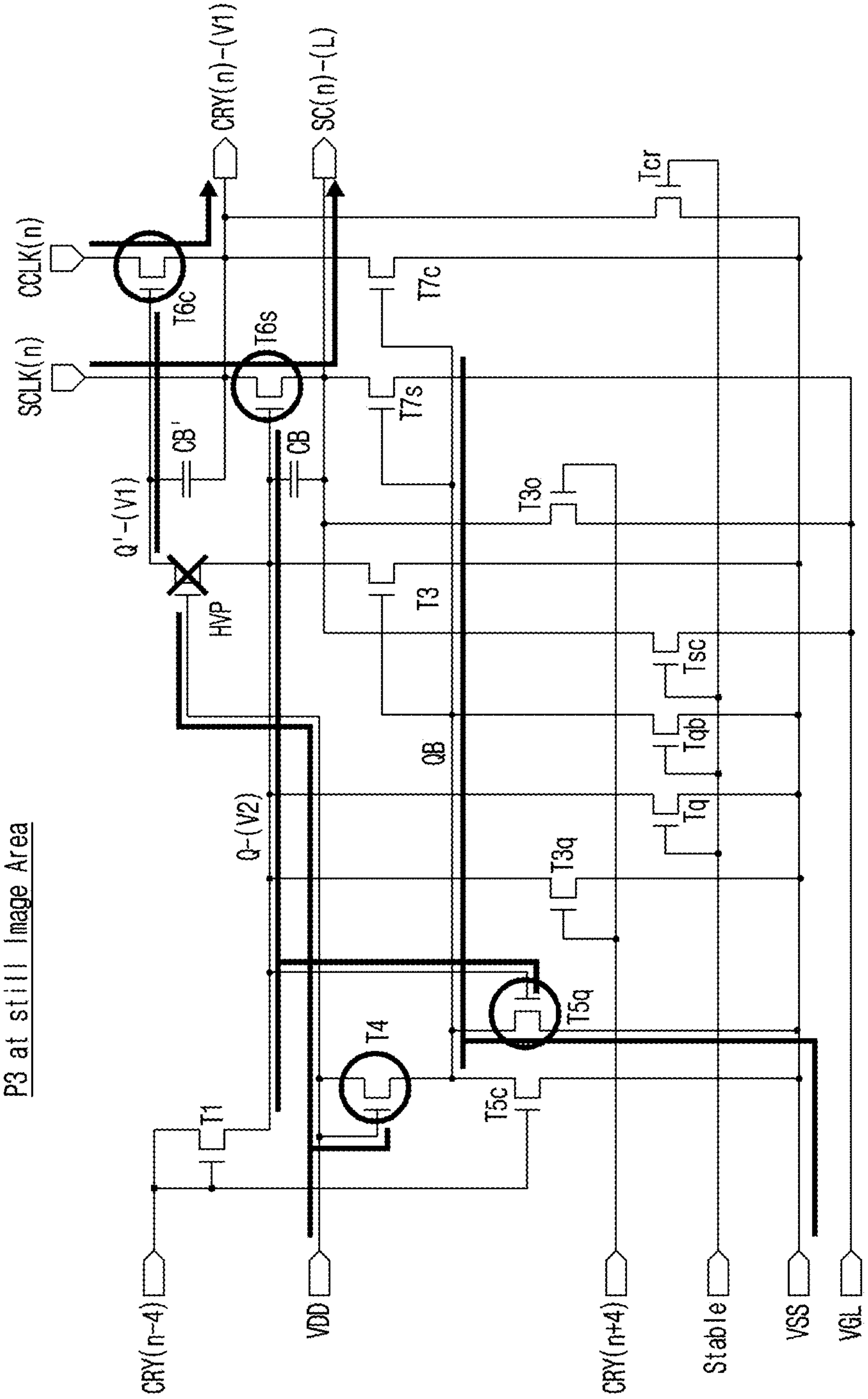
FIG. 16 is a diagram illustrating an operation method of second stages for driving a still image area in an output period of the timing chart shown in FIG. 9.

FIG. 10 to FIG. 15 are diagrams illustrating an operation method of the first stages for driving a dynamic image area according to the timing chart of FIG. 8, and FIG. 16 is a diagram illustrating an operation method of the second stages for driving a still image area in the output period of the timing chart of FIG. 9.

In the initialization period P1, the transistor T4 and the protection transistor HVP are turned on by the turn-on voltage H of the display driving signal VDD, and thus the turn-on voltage H can be supplied to the node QB.

In addition, the transistors T3, T7*s*, and T7*c* are turned on by the turn-on voltage H of the node QB, and thus the first low voltage VSS can be supplied to the node Q and the node Q', the second low voltage VGL, which is the turn-off voltage L, can be output to the scan output terminal, and the first low voltage VSS, which is the turn-off voltage L, can be output to the carry output terminal.

In the turn-on period P2, the transistors T1 and T5*c* are turned on by the turn-on voltage H of the previous carry signal CRY(n−4), and thus the first low voltage VSS, which is the turn-off voltage L, can be supplied to the node QB through the transistor T5*c*, and the turn-on voltage H of the previous carry signal CRY(n−4) can be supplied to the node Q and the node Q' through the transistor T1. Accordingly, the turn-on voltage H of the previous carry signal CRY(n−4) can be charged in the first and second capacitors CB and CB'.

In addition, the transistor Tos of the scan output terminal and the T6*c* transistor of the carry output stage can be turned on by the turn-on voltage H of the node Q and the node Q', and the scan output terminal and the carry output terminal can output the turn-off voltage L of the scan clock signal SCLK(n) and the carry clock signal CCLK(n).

Thereafter, in the output period P3 of FIG. 8, in which the stages shown in FIG. 7 operates as the first stages (e.g., STG 5 to STG8 in FIG. 6) driving the dynamic image area DIA, the previous carry signal CRY(n−4) is turned off and thus the node Q and the node Q' can maintain the turn-on voltage H.

In this state, the node Q is bootstrapped by the turn-on voltage H of the scan clock signal SCLK(n), and the scan output terminal can output the scan signal SC(n) having the bootstrapped voltage V1'.

The node Q' is bootstrapped by the turn-on voltage H of the carry clock signal CCLK(n), and the carry output terminal can output the carry signal CRY(n) having the bootstrapped voltage V1.

In this way, since the node Q and the node Q' are bootstrapped together in the output period P3 of FIG. 8, the node Q' and the node Q can have similar voltages, and the protection transistor HVP can be maintained in a turn-on state, as shown in FIG. 8.

In the turn-off period P4, the transistors T3*q* and T30 are turned on by the turn-on voltage H of the subsequent carry signal CRY(n+4), and thus the first low voltage VSS, which is the turn-off voltage L, can be supplied to the node Q and the node Q'.

In addition, the turn-on voltage H of the display driving signal VDD is supplied to the node QB according to the turn-on voltage H of the display driving signal, and the transistors T3, T7*s*, and T7*c* are turned on by the turn-on voltage H of the node QB, and thus the first low voltage VSS, which is the turn-off voltage L, can be output to the scan output terminal, and the second low voltage VGL, which is the turn-off voltage L, can be output to the carry output terminal.

In the sustain period P5, the subsequent carry signal CRY(n+4) has the turn-off voltage L while the display driving signal VDD has the turn-on voltage, and thus the transistors T3*q* and T30 can be turned off. Accordingly, the turn-off voltages L of the node Q and the node Q' are maintained, and the turn-on voltage H of the node QB is maintained, and thus the scan output terminal can output the second low voltage VGL and the carry output terminal can output the first low voltage VSS.

Thereafter, in the blank period, the display driving signal VDD has the turn-off voltage L, and the stable signal Stable can have the turn-on voltage H. The transistors Tq, Tqb, Tsc, and Ter can be turned on by the turn-on voltage H of the stable signal Stable.

Accordingly, the first low voltage VSS can be supplied to the node Q through the transistor Tq and to the node QB through the transistor Tqb. In addition, the scan output terminal can output the second low voltage VGL, which is the turn-off voltage L supplied through the transistor Tsc, and the carry output terminal can output the first low voltage VSS, which is the turn-off voltage L supplied through the transistor Tcr.

Accordingly, the turn-off voltage L can be stably maintained at the scan output terminal and the carry output terminal during the blank period.

Meanwhile, in a case where the stages shown in FIG. 7 operate as the second stages (e.g., STG1 to STG4 in FIG. 6) driving the still image area SIA, the carry clock signal CCLK(n) has the turn-on voltage H, but the scan clock signal SCLK(n) may have the turn-off voltage L as in the output period P3 of FIG. 9.

In this case, as shown in FIG. 16, the node Q' is bootstrapped by the turn-on voltage H of the carry clock signal CCLK(n), and thus the carry output terminal can output the carry signal CRY(n) having the bootstrapped V1.

However, the node Q may not be bootstrapped by the scan clock signal SCLK(n) having the turn-off voltage L, and the scan output terminal may output the turn-off voltage L of the scan clock signal SCLK(n).

In this case, as shown in FIG. 9 and FIG. 16, when the node Q' is bootstrapped during the output period P3, the voltage V1 of the node Q' may become higher than the voltage V2 of the node Q, and the protection transistor HVP may be turned off due to the voltage V1 of the node Q' higher than that of the node Q.

Accordingly, the voltage between the node Q and the scan output terminal (Vgs of T6*s* in FIG. 9), which is the gate-source voltage of the transistor Tos, does not exceed the specification range of the transistor T6*s*, and thus breakdown can be prevented.

However, unlike the present disclosure, if the protection transistor HVP is not provided and the stages operate as the second stages (e.g., STG1 to STG4 in FIG. 6) driving the still image area SIA, when the node Q' is bootstrapped by the input of the carry clock signal CCLK(n) having the turn-on voltage H, the voltage of the node Q may also rise.

At this time, since the scan output terminal outputs the scan signal SC(n) having the turn-off voltage L, the gate-source voltage Vgs of the transistor Tos exceeds the specification range of the transistor Tos, and thus the transistor Tos may be damaged by breakdown.

However, when the protection transistor HVP is provided as in the present disclosure, even if the voltage of the node Q' is bootstrapped to increase to be higher than the voltage of the node Q during the period in which the stages drive the still image area SIA, as described above, the voltage of the node Q does not rise and is maintained equal to the voltage V2 of the turn-on period P2, and thus the damage to the transistor Tos can be prevented.

In the implementation of the present disclosure, the protection transistor HVP is provided between the node Q and the node Q', and when the display panel 10 displays a dynamic image and a still image together during the first frame frame1, the protection transistor HVP provided in the first stages corresponded to a dynamic image area DIA is turned on and the protection transistor HVP provided in the second stages corresponded to a still image area SIA is turned off during the first frame frame1, and thus damage to transistors can be prevented.

According to implementations of the present disclosure, it is possible to reduce power consumption of a display device by supplying a scan signal having a turn-on voltage to a dynamic image area and supplying a scan signal having a turn-off voltage to a still image area.

According to the implementations of the present disclosure, it is possible to prevent damage to transistors by providing a protection transistor between the node Q and the node Q', turning on a protection transistor provided in a first stage corresponded to a dynamic image area, and turning off a protection transistor provided in a second stage corresponded to a still image area in a first frame period when the display panel displays a dynamic image and a still image together during the first frame period.

It will be apparent that various modifications and variations can be made in the present disclosure without departing from the spirit or scope of the present disclosure. Thus, it is intended that the present disclosure covers the modifications and variations of the present disclosure provided they come within the scope of the appended claims and their equivalents.

What is claimed is:

1. A display device comprising:

a display panel having an active area and a non-active area; and a gate driver configured to sequentially supply a scan signal to a plurality of gate lines connected to subpixels of the display panel, wherein the gate driver includes a plurality of stages each having a node Q electrically connected to a scan output terminal outputting the scan signal, a node Q' electrically connected to a carry output terminal outputting a carry signal, and a protection transistor having a first electrode connected to the node Q and a second electrode connected to the node Q', wherein the active area includes a dynamic image area in which a dynamic image is displayed during a first frame period and a still image area in which a still image is displayed during the first frame period, wherein a protection transistor provided in a first stage corresponded to the dynamic image area among the plurality of stages is turned on during the first frame period, and wherein a protection transistor provided in a second stage corresponded to the still image area among the plurality of stages is turned off during the first frame period.

2. The display device of claim 1, wherein the protection transistor of the second stage is turned off while the node Q' is bootstrapped in response to input of a carry clock signal during the first frame period.

3. The display device of claim 2, wherein the protection transistor of the first stage is turned on while the node Q' is bootstrapped in response to input of the carry clock signal during the first frame period.

4. The display device of claim 1, wherein the protection transistor of the first stage is turned on and the protection transistor of the second stage is turned off while the node Q' is bootstrapped during the first frame period.

5. The display device of claim 1, wherein a voltage of the node Q' is higher than a voltage of the node Q in the second stage while the node Q' is bootstrapped during the first frame period.

6. The display device of claim 1, wherein, during the first frame period, the first stage outputs a scan signal having a turn-on voltage and a carry signal having a turn-on voltage to the dynamic image area, and the second stage outputs the scan signal having a turn-off voltage and the carry signal having the turn-on voltage to the still image area.

7. The display device of claim 1, wherein, during the first frame period, the first stage receives a carry clock signal having a turn-on voltage and a scan clock signal having a turn-on voltage, and the second stage receives a carry clock signal having a turn-on voltage and a scan clock signal having a turn-off voltage.

8. The display device of claim 1, wherein each of the plurality of stages comprises:

a charging part configured to control supply of a turn-on voltage to the node Q, the node Q', and a node QB;

a discharging part configured to control supply of a turn-off voltage to the node Q, the node Q', and the node QB; and an output part configured to control output of a scan signal according to voltages of the node Q and the node QB, and control output of a carry signal according to voltages of the node Q' and the node QB.

9. The display device of claim 8, wherein the output part comprises:

a carry output part configured to control output of the carry signal in response to input of a carry clock signal; and a scan output part configured to control output of the scan signal in response to input of a scan clock signal.

10. The display device of claim 9, wherein each of the plurality of stages further comprises a stabilizer configured to supply a turn-off voltage to the node Q, the node Q', and the node QB and supply a turn-off voltage to the carry output part and the scan output part in a blank period of the first frame.

11. The display device of claim 1, wherein the plurality of stages is located in the non-active area and connected to a plurality of scan clock lines through which a scan clock signal is supplied and a plurality of carry clock lines through which a carry clock signal is supplied, wherein one line of the scan clock lines and the carry clock lines is provided on one side of the plurality of stages, and the other one line is provided on the other side of the plurality of stages.

12. The display device of claim 11, wherein the one line of the scan clock lines and the carry clock lines is located between an edge line of the display panel and the plurality of stages, and the other one line is located between the plurality of stages and subpixels of the active area.

* * * * *